(12) United States Patent
Bhugra et al.

(10) Patent No.: US 7,693,040 B1
(45) Date of Patent: Apr. 6, 2010

(54) PROCESSING SWITCH FOR ORTHOGONAL FREQUENCY DIVISION MULTIPLEXING

(75) Inventors: Harmeet Bhugra, San Jose, CA (US); Bertan Tezcan, San Jose, CA (US)

(73) Assignee: Integrated Device Technology, inc., San Jose, CA (US)

( * ) Notice: Subject to any disclaimer, the term of this patent is extended or adjusted under 35 U.S.C. 154(b) by 296 days.

(21) Appl. No.: 11/743,080

(22) Filed: May 1, 2007

(51) Int. Cl.
*H04J 11/00* (2006.01)
(52) U.S. Cl. .................. 370/208; 370/389; 370/476
(58) Field of Classification Search .................. None
See application file for complete search history.

(56) References Cited

U.S. PATENT DOCUMENTS

| | | | |
|---|---|---|---|
| 4,473,880 A | 9/1984 | Budde et al. | |
| 4,932,028 A | 6/1990 | Katircioglu et al. | |
| 4,987,529 A | 1/1991 | Craft et al. | |
| 4,991,171 A | 2/1991 | Teraslinna | |
| 5,072,363 A | 12/1991 | Gallagher | |
| 5,229,991 A | 7/1993 | Turner | |
| 5,276,684 A | 1/1994 | Pearson | |
| 5,305,311 A | 4/1994 | Lyles | |
| 5,440,546 A | 8/1995 | Bianchini, Jr. | |
| 5,710,549 A | 1/1998 | Horst et al. | |
| 5,999,981 A | 12/1999 | Willenz | |
| 6,098,110 A | 8/2000 | Witkowski et al. | |
| 6,134,229 A * | 10/2000 | Schwaller et al. | 370/336 |
| 6,377,782 B1 | 4/2002 | Bishop et al. | |
| 6,389,479 B1 | 5/2002 | Boucher et al. | |
| 6,598,179 B1 | 7/2003 | Chirashnya et al. | |
| 6,625,121 B1 | 9/2003 | Lau et al. | |
| 6,633,578 B1 | 10/2003 | Matsumaru et al. | |
| 6,647,449 B1 | 11/2003 | Watts | |
| 6,661,788 B2 | 12/2003 | Angle et al. | |
| 6,662,339 B1 | 12/2003 | Lanemann et al. | |
| 6,675,325 B1 | 1/2004 | Garney et al. | |
| 6,678,279 B1 | 1/2004 | Meredith | |
| 6,804,237 B1 | 10/2004 | Luo et al. | |
| 6,882,649 B1 | 4/2005 | Gura et al. | |
| 6,937,133 B2 | 8/2005 | Johnson et al. | |

(Continued)

FOREIGN PATENT DOCUMENTS

WO 0239667 5/2002

OTHER PUBLICATIONS

Bertan Tezcan and Bill Beane, "How to achieve low-cost, reusable wireless infrastructure through modular baseband design," Wireless Net DesignLine, Aug. 8, 2006, available at http://www.wirelessnetdesignline.com.

(Continued)

*Primary Examiner*—Min Jung
(74) *Attorney, Agent, or Firm*—Stanley J. Pawlik; Kenneth Glass; Glass & Associates

(57) ABSTRACT

A baseband processor includes a processing switch for performing orthogonal frequency division multiplexing operations on data packets and routing the data packets in the baseband processor. Additionally, the baseband processor includes digital signal processors for performing symbol processing operations on the data packets. The baseband processor is scalable such that digital signal processors may be added to, or removed from, the baseband processor. Further, the baseband processor is programmable such that the symbol processing operations may be distributed among the digital signal processors.

27 Claims, 11 Drawing Sheets

U.S. PATENT DOCUMENTS

| | | | |
|---|---|---|---|
| 6,954,463 | B1 | 10/2005 | Ma et al. |
| 6,954,811 | B2 | 10/2005 | Vishnu |
| 6,954,812 | B2 | 10/2005 | Lavigne |
| 6,963,576 | B1 | 11/2005 | Lee |
| 6,975,651 | B1 | 12/2005 | Ono et al. |
| 7,020,161 | B1 | 3/2006 | Eberle et al. |
| 7,023,840 | B2 | 4/2006 | Golla et al. |
| 7,027,443 | B2 | 4/2006 | Nichols et al. |
| 7,058,789 | B2 | 6/2006 | Henderson et al. |
| 7,106,742 | B1 | 9/2006 | Frisch et al. |
| 7,224,671 | B2 | 5/2007 | Lee et al. |
| 7,260,120 | B2 | 8/2007 | Kang et al. |
| 2001/0014105 | A1 | 8/2001 | Tezuka et al. |
| 2001/0020266 | A1 | 9/2001 | Kojima et al. |
| 2002/0085550 | A1 | 7/2002 | Rhodes |
| 2002/0141256 | A1 | 10/2002 | Barri et al. |
| 2003/0110206 | A1 | 6/2003 | Osokine |
| 2003/0147394 | A1 | 8/2003 | Jennings et al. |
| 2004/0153835 | A1 | 8/2004 | Song et al. |
| 2004/0179535 | A1 | 9/2004 | Bertagna |
| 2004/0184466 | A1 | 9/2004 | Chang et al. |
| 2004/0258086 | A1 | 12/2004 | Kurupati |
| 2005/0058127 | A1 | 3/2005 | Munter et al. |
| 2005/0111434 | A1 | 5/2005 | Halen |
| 2005/0138055 | A1 | 6/2005 | Handlogten |
| 2005/0232201 | A1 | 10/2005 | Bysted et al. |
| 2005/0249244 | A1 | 11/2005 | McNamara et al. |
| 2006/0007885 | A1* | 1/2006 | Pollack et al. ............... 370/328 |
| 2006/0050738 | A1 | 3/2006 | Carr et al. |
| 2006/0128436 | A1* | 6/2006 | Doi et al. ................. 455/562.1 |
| 2006/0248377 | A1* | 11/2006 | Tezcan et al. .................. 714/4 |
| 2006/0251069 | A1 | 11/2006 | Cathey et al. |
| 2007/0072646 | A1* | 3/2007 | Kuwahara et al. ........... 455/561 |
| 2007/0124554 | A1* | 5/2007 | Allen et al. ................. 711/163 |
| 2007/0242599 | A1* | 10/2007 | Gorday et al. .............. 370/208 |
| 2008/0219235 | A1* | 9/2008 | Ma et al. .................... 370/344 |
| 2008/0298492 | A1* | 12/2008 | Hwang et al. ............... 375/260 |

OTHER PUBLICATIONS

Bertan Tezcan and Bill Beane, "Achieving modular wireless infrastructure design: A compelling look at benefits supporting connectivity amongst DSPs, FPGAs, or ASICs," OpenSystems Publishing, Sep. 22, 2006, available at http://www.dsp-fpga.com/articles/tezcan_and_beane.

Bertan Tezcan and Bill Beane, "Modular baseband design—Enabling a low-cost reusable wireless infrastructure(Part I)," Portable Design Online Article, Feb. 15, 2007, previously available at http://pd.pennnet.com.

Bertan Tezcan and Bill Beane, "Modular baseband design—Enabling a low-cost reusable wireless infrastructure(Part II)," Portable Design Online Article, Feb. 15, 2007, previously available at http://pd.pennnet.com.

Lukas Sekanina and Vladimir Drabek, "Theory and Applications of Evolvable Embedded Systems," Proceedings of the 11th IEEE International Conference and Workshop on the Engineering of Computer-Based Systems (ECBS'04), 2004.

RapidIO: An Embedded System Component Network Architecture, Feb. 22, 2000, Motorola.

RFC: 791, DARPA Internet Program Protocol Specification, Sep. 1981, Information Science Institute.

802.11 standard, Aug. 21, 2002, http://wlan.nat.sdu.dk/802_11standard.htm.

History of the I2C Bus, Circa 2000, ESAcademy.

International Search Report, PCT/US2006/013767, Jul. 31, 2006.

"Solano Communications IC: A High-Throughput Solution for 3G Wireless and Broadband Base Stations," Spectrum Wireless Systems, Admitted Prior Art, 4 pages.

"Tsi568A: Serial RapidIO Switch," Tundra Semiconductor Corp., Printed From Internet Feb. 17, 2005, 4 pages.

"RapidIO: An Embedded System Component Network Architecture," Architecture and Systems Platforms, Motorola Semiconductor Product Sector, Feb. 22, 2000, 25 pages.

"Cisco MDS 9020 Fabric Switch Configuration Guide and Command Reference, Release 2.x," pp. 10-1 through 10-4, Cisco Systems, Inc., Jun. 2005.

Peter J. Welcher, "Configuring SNMP on Switches, and Syslog," Jun. 24, 1999.

"RapidIO Interconnect Specification, Part 8, Error Management, Extensions Specification," RapidIO Trade Association, Jun. 2005.

* cited by examiner

PROCESSING SWITCH FOR ORTHOGONAL FREQUENCY DIVISION MULTIPLEXING

CROSS-REFERENCES TO RELATED APPLICATIONS

The present application is related to co-pending U.S. patent application Ser. No. 11/395,575, filed Mar. 31, 2006, entitled "Combined Packet Processor and RIO Switch on Single Chip for DSP Clustered Applications," co-pending U.S. patent application Ser. No. 11/394,886, filed Mar. 31, 2006, entitled "Allocating Destination Addresses to a Switch to Perform Packet Processing on Selected Packets with Corresponding Destination Address," co-pending U.S. patent application Ser. No. 11/395,570, filed Mar. 31, 2006, entitled "Performing Packet Manipulation Options to Transform Packet Data to a Format More Compatible with Processor," co-pending U.S. patent application Ser. No. 11/383,121, filed on May 12, 2006, entitled "Error Management System and Method for a Packet Switch," co-pending U.S. patent application Ser. No. 11/383,165, filed on May 12, 2006, entitled "Packet Processing in a Packet Switch with Improved Output Data Distribution," and co-pending U.S. patent application Ser. No. 11/383,150, filed on May 12, 2006, entitled "System and Method of Constructing Data Packets in a Packet Switch," each of which is incorporated herein by reference in its entirety.

BACKGROUND

In some wireless communication systems, a base station processes a baseband signal including orthogonal frequency division multiplexing (OFDM) encoded communication channels. A baseband card in the base station includes a processor for performing OFDM operations on the baseband signal to reconstruct the communication channels. Additionally, the baseband card includes digital signal processors, each of which is dedicated to one or more of the communication channels and performs signal processing operations on those communication channels. For example, a digital signal processor may be dedicated to a communication channel including voice data and may perform a voice data algorithm on the voice data in that communication channel. In addition to the processor and the digital signal processors, some baseband cards include a switch for routing the processed communication channels to destinations external of the baseband card for further processing.

Because the data in individual communication channels varies with usage of that communication channel, at any given time a digital signal processor in the baseband card may be operating near its processing capacity while another digital signal processor may be operating substantially below its processing capacity. Generally, the processing capacity of the baseband card depends upon the processing capacity of each of the individual digital signal processors. Additionally, because the baseband card has a fixed number of digital signal processors, the processing capacity of the baseband card is generally limited by the number of digital signal processors in the baseband card.

In light of the above, a need exists for an improved system and method of processing baseband signals by using orthogonal frequency division multiplexing.

SUMMARY

In various embodiments, a baseband processor includes a processing switch for performing orthogonal frequency division multiplexing operations on data packets received by the baseband processor and routing the data packets through the baseband processor. The data packets include data representing communication channels of a baseband signal. The baseband processor also includes digital signal processors coupled to the processing switch for performing symbol processing operations on data in the communication channels. The baseband processor is scalable such that digital signal processors may be added to, or removed from, the baseband processor. In this way, the processing capacity of the baseband processor may be increased or decreased. Further, the baseband processor is programmable such that the symbol processing operations may be distributed among the digital signal processors to perform load balancing for the communication channels.

An advantage of the baseband processor is that the configuration of the processing switch is independent of the configuration of digital signal processors in the baseband processor. Moreover, digital signal processors may be added to, or removed from, the baseband processor without a need for changing the configuration of the processing switch. Consequently, the same processing switch may be used for different configurations of digital signal processors, which avoids custom designing the processing switch for each configuration of the digital signal processors. Further, the digital signal processors may be standard digital signal processors (e.g., off-the-shelf digital signal processors) and need not be custom designed for a particular application of the baseband processor.

Another advantage of the baseband processor is flexibility in processing the communication channels by the digital signal processors. Because the digital signal processors are programmable, a single digital signal processor may be programmed to process a single communication channel or to process multiple communication channels. Further, multiple digital signal processors may be programmed to process a single communication channel.

A processing switch, in accordance with one embodiment, is configured to receive a baseband data packet comprising a baseband input. The processing switch is further configured to generate a symbol data packet comprising data symbols by performing at least one orthogonal frequency division multiplexing operation on the baseband input. The processing switch is also configured to output the generated symbol data packet from terminals of the processing switch and receive a set of channel data packets at terminals of the processing switch. Each of the channel data packets in the set of channel data packets is associated with at least one communication channel and includes at least one processed data symbol. Further, the processing switch is configured to output the set of channel data packets.

An advantage of outputting the generated symbol data packet from terminals of the processing switch is that each of the digital signal processors coupled to the terminals may individually process the generated symbol data packet to generate one or more of the channel data packets in the set of channel data packets. Further, an additional digital signal processor may be coupled to an available terminal of the processing switch and programmed to generate one or more of the channel data packets in the set of channel data packets.

A baseband processor, in accordance with one embodiment, includes a processing switch and digital signal processors coupled to the processing switch. The processing switch is configured to receive a baseband data packet including a baseband input. Additionally, the processing switch is configured to generate a symbol data packet comprising data symbols by performing at least one orthogonal frequency division multiplexing operation on the baseband input. The digital signal processors are configured to generate a first set of channel data packets, each of which is associated with at least one communication channel. Each of the digital signal processors is configured to generate a channel data packet in the first set of channel data packets by selecting at least one data symbol associated with a communication channel in the symbol data packet generated by the processing switch and performing at least one symbol processing operation on each selected data symbol.

An advantage of each digital processor selecting data symbols associated with a communication channel in the generated symbol data packet is that the processing switch need not generate a data packet for each communication channel and route the data packet to the appropriate digital signal processor. Instead, the processing switch provides the generated symbol data packet to the digital signal processors and each of the digital signal processors selects the data symbols of a communication channel from the generated symbol data packet and generates a channel data packet associated with that communication channel.

A method of processing data in wireless communication system, in accordance with one embodiment, includes receiving a baseband data packet including a baseband input. The method also includes generating a symbol data packet by performing at least one orthogonal frequency division multiplexing operation on the baseband data packet. The generated symbol data packet includes data symbols, each of which is associated with a communication channel. The method further includes selecting the data symbols associated with each communication channel in the generated symbol data packet. Additionally, the method includes generating a set of channel data packets by performing at least one symbol processing operation on at least one data symbol of each communication channel to generate a corresponding channel data packet in the set of channel data packets.

An advantage of generating a symbol data packet including data symbols of communication channels is that an individual data packet need not be generated for each communication channel. Instead, the data symbols of a given communication channel may be selected from the generated data packet and processed to generate a channel data packet in the set of channel data packets.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, a baseband processor includes a processing switch for performing orthogonal frequency division multiplexing operations on data packets and routing the data packets in the baseband processor. Additionally, the baseband processor includes digital signal processors for performing symbol processing operations on the data packets. The baseband processor is scalable such that digital signal processors may be added to, or removed from, the baseband processor. Further, the baseband processor is programmable such that the symbol processing operations may be distributed among the digital signal processors.

Figure 1:
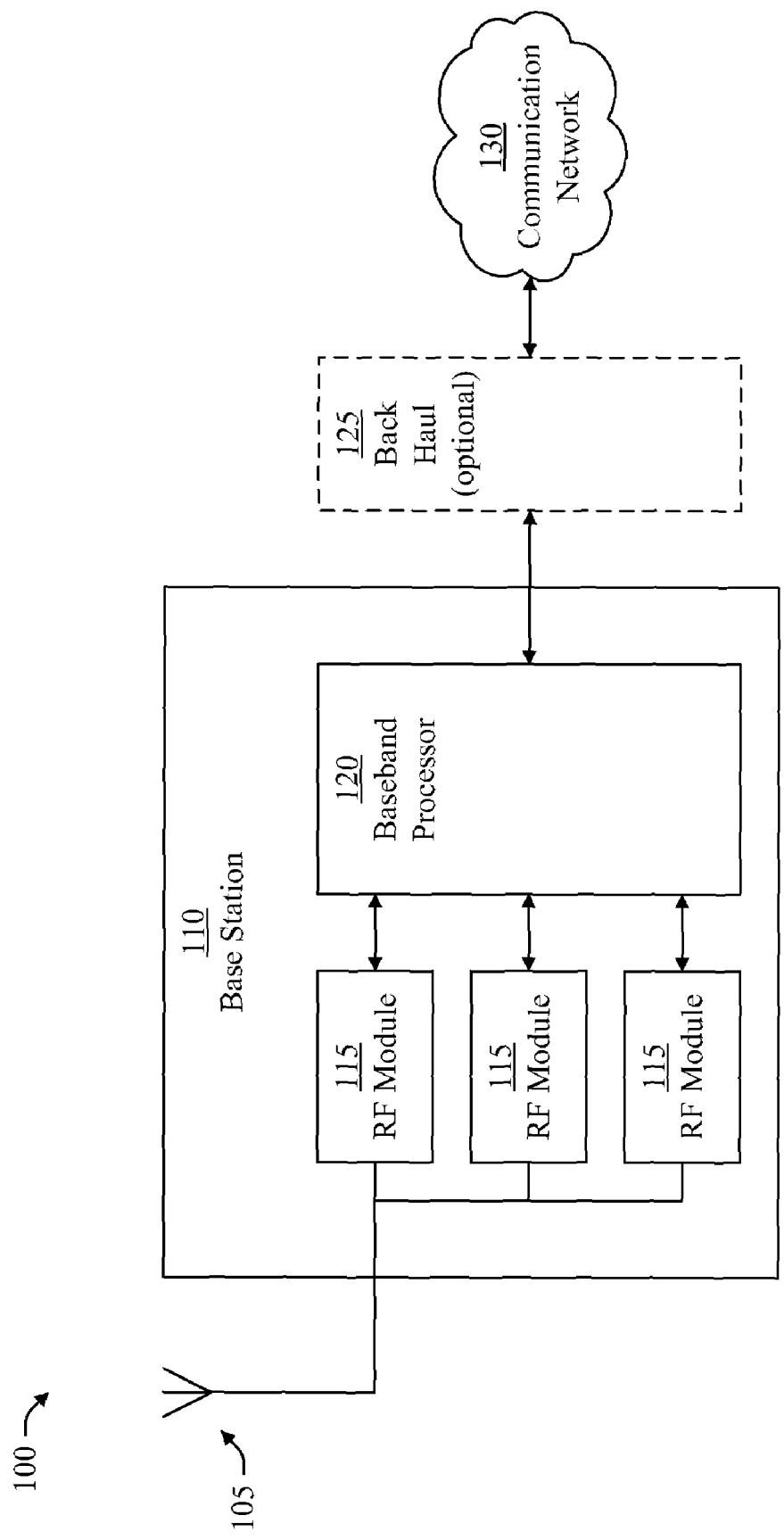
FIG. 1 is a block diagram of a wireless communication system, in accordance with an embodiment of the present invention.

FIG. 1 illustrates a wireless communication system 100, in accordance with an embodiment of the present invention. The wireless communication system 100 includes an antenna 105, a base station 110, and an optional back haul 125. The base station 110 is coupled to the antenna 105 and a communication network 130. As illustrated in FIG. 1, the base station 110 is coupled to the communication network 130 through the back haul 125. The base station 110 includes radio-frequency (RF) modules 115 and a baseband processor 120. The RF modules 115 are coupled to the antenna 105 and the baseband processor 120. For example, each RF module 115 may be a radio-frequency (RF) card. Additionally, the baseband processor 120 is coupled in communication with the communication network 130, for example through the back haul 125. Although the base station 110 illustrated in FIG. 1 includes three RF modules 115, the base station 110 may include more or fewer RF modules 115 in other embodiments. Moreover, the base station 110 may include more than one baseband processor 120 in other embodiments.

The RF module 115 receives a radio-frequency (RF) signal including sub-carrier signals. Each of the sub-carrier signals has a unique frequency range and carries a communication channel. The communication channel includes data of a communications such as, for example, voice data or text data. Moreover, the frequency ranges of the sub-carriers are spaced apart in frequency, which provides orthogonality to the communication channels. For example, the RF signal may include an orthogonal frequency division multiplexing (OFDM) signal.

The RF module 115 converts the RF signal to a baseband signal including the communication channels and provides the baseband signal to the baseband processor 120. The baseband processor 120 reconstructs the communication channels from the baseband signal by performing orthogonal frequency division multiplexing operations on the baseband signal. Additionally, the baseband processor 120 performs symbol processing operations on the data in each communication channel and provides the communication channels to the communication network 130. In one embodiment, the baseband processor 120 provides the communication channels to the back haul 125 and the back haul 125 transmits the communication channels to the communication network 130. The communication network 130 may be any type of network for transmitting data, such as a public switched telephone network (PSTN) or the Internet. The back haul 125 may include electronic circuits and devices, such as a computing system, for transmitting the communication channels to the communication network 130.

Additionally, the baseband processor 120 receives communication channels from the communication network 130, for example through the back haul 125. The baseband processor 120 performs symbol processing operations on the data in the communication channels. Further, the baseband processor 120 performs OFDM operations on the communication channels and generates a baseband signal including the communication channels. The baseband processor 120 provides the baseband signal to one of the RF modules 115. In turn, the RF module 115 converts the baseband signal to a radio-frequency (RF) signal, which includes sub-carrier signals carrying the communication channels.

In various embodiments, the baseband processor 120 receives a baseband data packet from one of the RF modules 115. The baseband data packet received from the RF module 115 includes a baseband input representing a baseband signal generated by the RF module 115. The baseband processor 120 performs OFDM operations on the baseband input in the baseband data packet to generate data symbols representing the data in the communication channels of the baseband signal. In this way, the baseband processor 120 reconstructs the communication channels in the baseband signal from the baseband input.

Additionally, the baseband processor 120 performs symbol processing operations on the data symbols in the communication channels. For example, a communication channel may include voice data and the baseband processor 120 may perform a voice processing algorithm, such as a compression algorithm, on data symbols representing the voice data. As another example, a communication channel may include text data and the baseband processor 120 may perform a data processing algorithm, such an error correction algorithm, on data symbols representing the text data.

The baseband processor 120 generates one or more channel data packets for each communication channel, each of which includes the processed data symbols of the communication channel and an identifier of the communication channel. In this way, each channel data packet generated by the baseband processor 120 is associated with the communication channel. Further, the baseband processor 120 provides the channel data packets to the communication network 130.

Additionally, the baseband processor 120 receives channel data packets associated with communication channels from the communication network 130. Each of the channel data packets received by the baseband processor 120 from the communication network 130 includes an identifier of a communication channel associated with the channel data packet. Additionally, each of the channel data packets received by the baseband processor 120 from the communication network 130 includes data symbols of the communication channel associated with the channel data packet.

The baseband processor 120 performs symbol processing operations on the data symbols in the channel data packets. For example, the baseband processor 120 may perform a voice processing algorithm or a data processing algorithm on the data symbols. The baseband processor 120 generates a baseband output including the communication channels by performing OFDM operations on the processed data symbols of the communication channels. Additionally, the baseband processor 120 generates a baseband data packet including the baseband output, and provides the baseband data packet to one of the RF modules 115. In turn, the RF module 115 converts the baseband output in the baseband data packet to a radio-frequency (RF) signal including sub-carrier signals, each of which is modulated with one of the communication channels. Further, the RF module 115 transmits the RF signal from the base station 110 through the antenna 105.

In some embodiments, baseband processor 120 receives baseband data packets formatted in a Serial RapidIO (Serial RIO) format from the RF modules 115. In further embodiments, the baseband processor 120 generates channels data packets formatted in a Serial RIO format. Further, the baseband processor 120 may receive channel data packets formatted in a Serial RIO format and generate baseband data packets formatted in a Serial RIO format. In some embodiments, the baseband processor 120 may receive baseband data packets formatted in a Parallel RapidIO (Parallel RIO) format or generate baseband data packets formatted in a Parallel RIO format, or both. In further embodiments, the baseband processor 120 may receive channel data packets formatted in a Parallel RIO format or generate channel data packets formatted in a Parallel RIO format, or both.

Figure 2:
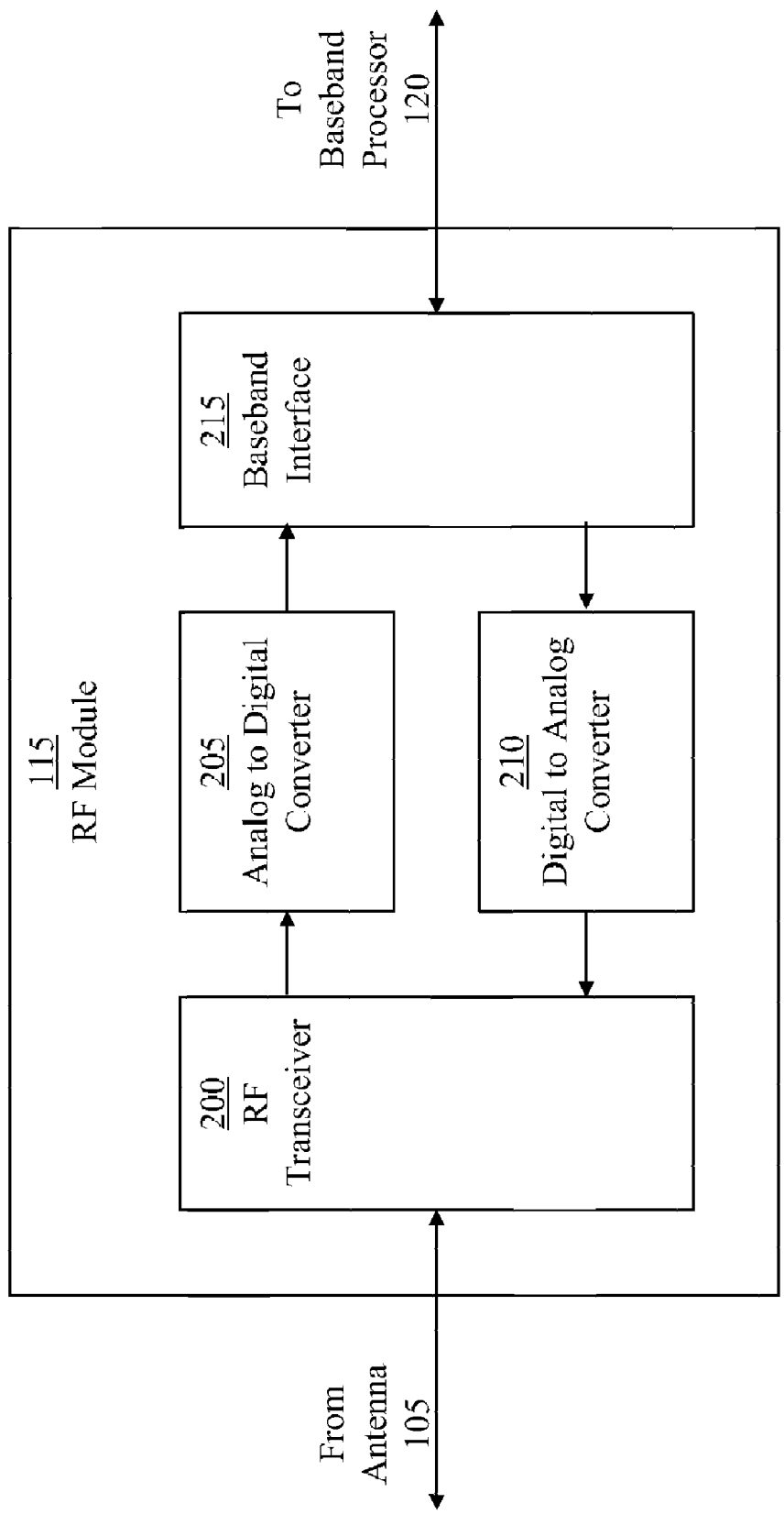
FIG. 2 is a block diagram of a radio-frequency module, in accordance with an embodiment of the present invention.

FIG. 2 illustrates the RF module 115, in accordance with an embodiment of the present invention. The RF module 115 includes a radio-frequency (RF) transceiver 200, an analog to digital converter 205, a digital to analog converter 210, and a baseband interface 215. The RF transceiver 200 is coupled to the antenna 105, the analog to digital converter 205, and the digital to analog converter 210. The baseband interface 215 is coupled to the analog to digital converter 205, the digital to analog converter 210, and the baseband processor 120.

In an uplink operation, the RF module 115 receives a radio-frequency (RF) signal from the antenna 105 and converts the RF signal to an analog baseband signal, for example by down-converting a frequency of the RF signal to a baseband frequency of analog baseband signal. The analog to digital converter 205 converts the analog baseband signal to a digital baseband signal. The baseband interface 215 provides the digital baseband signal to the baseband processor 120. In various embodiments, the baseband interface 215 generates a baseband data packet, which includes a baseband input representing the digital baseband signal, and provides the baseband data packet to the baseband processor 120. For example, the baseband interface 215 may generate the baseband data packet formatted in a common public radio interface (CPRI) format or a Serial RIO format.

In a downlink operation, the baseband interface 215 receives a digital baseband signal from the baseband processor 120. In various embodiments, the baseband interface 215 receives a baseband data packet from the baseband processor 120, which includes a baseband output representing a digital baseband signal. For example, the baseband interface 215 may receive the baseband data packet formatted in a common public radio interface (CPRI) format or a Serial RIO format. The baseband interface 215 generates the digital baseband signal represented by the baseband output and provides the digital baseband signal to the digital to analog converter 210. The digital to analog converter 210 converts the digital baseband signal to an analog baseband signal and provides the analog baseband signal to the RF transceiver 200. The RF transceiver 200 converts the analog baseband signal to an RF signal, for example by up-converting a baseband frequency of the analog baseband signal to a frequency of the RF signal, and transmits the RF signal from the antenna 105.

Figure 3:
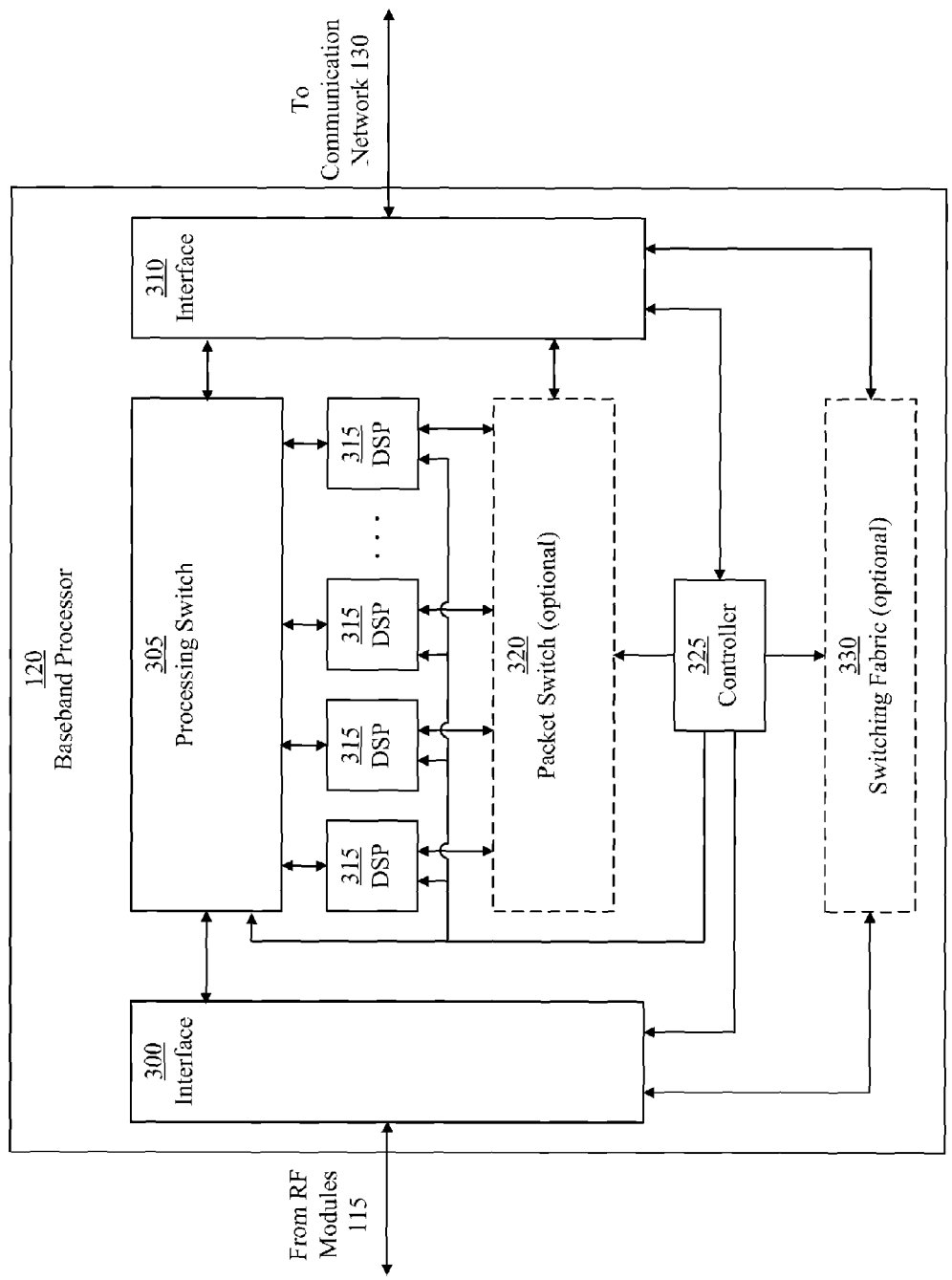
FIG. 3 is a block diagram of a baseband processor, in accordance with an embodiment of the present invention.

FIG. 3 illustrates the baseband processor 120, in accordance with an embodiment of the present invention. The baseband processor 120 includes an interface 300, a processing switch 305, an interface 310, digital signal processors 315, an optional packet switch 320, a controller 325, and an optional switching fabric 330. The interface 300 is coupled to the RF modules 115, the processing switch 305, and the controller 325. The interface 310 is coupled to the processing switch 305 and the controller 325. Each of the digital signal processors 315 is coupled to the processing switch 305 and the controller 325. Additionally, the controller 325 is coupled to the processing switch 305. In embodiments including the packet switch 320, the packet switch 320 is coupled to the interface 310, the digital signal processors 315, and the controller 325. In embodiments including the switching fabric 330, the switching fabric 330 is coupled to the interface 300, the interface 310, and the controller 325.

The interface 300 receives data packets (e.g., baseband data packets) from the RF modules 115 and provides the data packets to the processing switch 305. The interface 300 may include data buffers, such as a data queue, for storing data packets received from the RF modules 115. In this way, the interface 300 may receive data packets from the RF modules 115 at one data rate and provide the data packets to the processing switch 305 at another data rate. Additionally, the interface 300 receives data packets (e.g., baseband data packets) from the processing switch 305 and provides the data packets to the RF modules 115, for example based on identifiers in the data packets.

In embodiments including the switching fabric 330, the interface 300 routes data packets to the processing switch 305 or the switching fabric 330 based on identifiers in the data packets. Further, the interface 300 receives data packets from the processing switch 305 and the switching fabric 330 and provides the data packets to the RF modules 115, for example based on identifiers in the data packets.

The processing switch 305 performs OFDM operations on data packets (e.g., baseband data packets or symbol data packets) received from the interface 300, the interface 310, or the digital signal processors 315. If the processing switch 305 receives a baseband data packet including a baseband input from the interface 300, the processing switch 305 generates a symbol data packet based on the baseband input and provides the symbol data packet to the digital signal processors 315 for further processing. If the processing switch 305 receives a channel data packet including processed data symbols of a communication channel from a digital signal processor 315, the processing switch 305 routes the channel data packet to the interface 310 or the digital signal processors 315.

If the processing switch 305 receives channel data packets including data symbols of communication channels from the interface 310, the processing switch 305 provides the channel data packets to the digital signal processors 315 for further processing. Additionally, the processing switch 305 receives symbol data packets containing processed data symbols from the digital signal processors 315 and generates a baseband data packet containing a baseband output by performing OFDM operations on the processed data symbols in the symbol data packets. Further, the processing switch 305 routes the baseband data packet to the interface 300.

The digital signal processors 315 receive symbol data packets from the processing switch 305, generate channel data packets based on the symbols data packets, and provide the channel data packets to the processing switch 305. Additionally, the digital signal processors 315 receive channel data packets from the processing switch 305, generate symbols data packets based on the channel data packets, and provide the symbol data packets to the processing switch 305 for further processing.

If the digital signal processors 315 receive a symbol data packet containing data symbols from the processing switch 305, each of the digital signal processors 315 may select data symbols of a communication channel in the data symbol packet and generate a channel data packet by performing symbol processing operations on the selected data symbols. The channel data packet generated by the digital signal processor 315 is associated with a communication channel and contains processed data symbols of the communication channel. Additionally, the digital signal processors 315 provide the channel data packets to the processing switch 305, and the processing switch 305 routes the channel data packets to the interface 310. In some embodiments, the digital signal processors 315 provide the channel data packets to the packet switch 320 instead of the processing switch 305, and the packet switch 320 routes the data packets to the interface 310.

If the digital signal processors 315 receive channel data packets from the processing switch 305, each of the digital signal processors 315 may select data symbols of a communication channel in one or more of the channel data packets and generate a symbol data packet by performing symbol processing operations on the selected data symbols. Each of the channel data packets received by the digital signal processors 315 and each of the symbol data packets generated by the digital signal processors 315 is associated with one or more communication channels and includes data symbols of each communication channel. The digital signal processors 315 provide the symbol data packets containing the processed data symbols to the processing switch 305 for further processing.

In various embodiments, the base station 110 performs an uplink operation by receiving an RF signal including communication channels, generating channel data packets containing processed data symbols of the communication channels, and providing the channel data packets to the communication network 130. Additionally, the base station 110 performs a downlink operation by receiving channel data packets containing data symbols of communication channels from the communication network 130, generating an RF signal containing the communication channels, and transmitting the RF signal from the antenna 105.

In an uplink operation, in accordance with one embodiment, the interface 300 receives a data packet from an RF module 115 and provides the data packet to the processing switch 305. The data packet received by the RF module 115 is a baseband data packet including a data payload, which includes a baseband input representing a baseband signal generated by the RF module 115. The processing switch 305 receives the baseband data packet and generates data symbols of communication channels in the baseband signal by performing OFDM operations on the baseband input in the baseband data packet. Further, the processing switch 305 generates a symbol data packet including the data symbols of the communication channels and provides the symbol data packet to one or more of the digital signal processors 315. In one embodiment, the processing switch 305 provides the symbol data packet to the digital signal processors 315 by broadcasting the symbol data packet to the digital signal processors 315.

One or more of the digital signal processors 315 selects the data symbols of one or more communication channels in the symbol data packet and performs symbol processing operations on the selected data symbols. Example symbol processing operations include performing forward error correction (FEC) on the selected data symbols or performing media access control (MAC) operations on the selected data symbols. Other examples of symbol processing operations include performing a voice processing algorithm on selected data symbols or performing a data processing algorithm on the selected data symbols. Additionally, each of the digital signal processors 315 that selects data symbols of a communication channel generates a channel data packet associated with the communication channel and including the processed data symbols of the communication channel. The channel data packet also includes an identifier of the communication channel associated with the channel data packet. In some embodiments, the channel data packet may include processed data symbols of more than one communication channel and an identifier of each of those communication channels. Further, a digital signal processor 315 may be associated with more than one communication channel.

The digital signal processors 315 provide the channel data packets to the processing switch 305, and the processing switch 305 routes each of the channel data packets to the interface 310 based on an identifier (e.g., a channel identifier) in the channel data packet. In turn, the interface 310 provides the channel data packets to the communication network 130, for example through the back haul 125. In various embodiments, the baseband data packet received by the processing switch 305, the symbol data packet generated by the processing switch 305, or each of the channel data packets generated by the digital signal processors 315, or any combination thereof, is formatted in a Serial RIO format. In some embodiments, a channel data packet or a digital signal processor 315, or both, may be associated with more than one communication channel.

In a downlink operation, in accordance with one embodiment, the interface 310 receives data packets from the communication network 130, for example through the back haul 125. In various embodiments, the interface 310 receives channel data packets from the communication network 130, each of which is associated with a communication channel and includes data symbols of the data channel. In one embodiment, the interface 310 provides the channel data packets to the processing switch 305, and the processing switch 305 provides the channel data packets to the digital signal processors 315. The processing switch 305 may provide the channel data packets to the digital signal processors 315 by broadcasting each of the channel data packets to the digital signal processors 315. Alternatively, the processing switch 305 may identify a digital signal processor 315 associated with a communication channel based on an identifier (e.g., a channel identifier) in the channel data packet and route the channel data packet to the digital signal processor 315.

In another embodiment, the interface 310 provides the channel data packets received from the communication network 130 to the packet switch 320. In turn, the packet switch 320 provides the channel data packets to the digital signal processors 315. The packet switch 320 may provide the channel data packets to the digital signal processors 315 by broadcasting each of the channel data packets to the digital signal processors 315. Alternatively, the packet switch 320 may identify a digital signal processor 315 associated with a communication channel based on an identifier (e.g., a channel identifier) in the channel data packet and route the channel data packet to the digital signal processor 315. In one embodiment, the packet switch 320 is a transport layer switch.

Each of the digital signal processors 315 is associated with a communication channel and selects data symbols of the communication channel in one or more channel data packets received by the digital signal processor 315. Additionally, each of the digital signal processors 315 generates a symbol data packet by performing symbol processing operations on the data symbols selected by the digital signal processor 315 and provides the symbol data packet to the processing switch 305. The symbol data packet includes the data symbols processed by the digital signal processor 315 and an identifier of the communication channel containing the data symbols.

The processing switch 305 receives the symbol data packets from the digital signal processors 315 and generates a baseband data packet by performing OFDM operations on the processed data symbols in the symbol data packets. The baseband data packet generated by the processing switch 305 includes a baseband output, which represents a baseband signal including the communication channels associated with the symbol data packets received from the digital signal processors 315. Further, the processing switch 305 provides the baseband data packet to the interface 300, and the interface 300 provides the baseband data packet to one of the RF modules 115. In turn, the RF module 115 generates an RF signal based on the baseband output of the baseband data packet and transmits the RF signal from the antenna 105. In various embodiments, the channel data packets received by the digital signal processors 315, the symbol data packets generated by the digital signal processors 315, or the baseband data packet generated by the processing switch 305, or any combination thereof, is formatted in a Serial RIO format.

In various embodiments, the digital signal processors 315 are programmable and the controller 325 associates each digital signal processor 315 with one or more communication channels by programming the digital signal processors 315. Additionally, the controller 325 may individually program the digital signal processors 315 to perform symbol processing operations on data symbols selected by the digital signal processor 315. For example, the controller 325 may program a digital signal processor 315 to perform a custom or proprietary algorithm on the data symbols selected by the digital signal processor 315.

In one embodiment, the controller 325 programs the digital signal processors 315 based on user input received by the controller 325, for example from the interface 310. In another embodiment, the controller 325 monitors performance characteristics of the baseband processor 120 and programs the digital signal processors 315 based on the performance characteristics. For example, the controller 325 may selectively associate communication channels with the digital signal processors 315 to perform load balancing among the digital signal processors 315. In some embodiments, the processing switch 305 includes the controller 325.

In a further embodiment, the baseband processor 120 is scalable such that digital signal processors 315 may be added to, or removed from, the baseband processor 120. In this embodiment, the baseband processor 120 includes terminals for connecting digital signal processors 315 to the processing switch 305. The processing capacity of the baseband processor 120 may be increased by connecting an additional digital signal processor 315 to an available terminal of the baseband processor 120. The processing capacity of the baseband processor 120 may be decreased by disconnecting a digital signal processor 315 from the terminal of the baseband processor 120 to which it is connected.

In one embodiment, the processing switch 305 includes the terminals of the baseband processor 120. For example, the processing switch 305 may comprise a single packaged semiconductor die and the terminals of the processing switch 305 include output pins of the packaged semiconductor die. In a further embodiment, the baseband processor 120 includes receptacles, each of which is coupled to a terminal of the processing switch 305 for receiving a digital signal processor 315. In this way, an additional digital signal processor 315 may be coupled to an available terminal of the processing switch 305 by inserting the digital signal processor 315 into the receptacle coupled to the terminal. Further, a digital signal processor 315 may be decoupled from a terminal of the processing switch 305 by removing the digital signal processor 315 from the receptacle coupled to the terminal.

In one embodiment, the baseband processor 120 includes a circuit board. In this embodiment, the processing switch 305, the digital signal processors 315, and the controller 325 are mounted on the circuit board. For example, the baseband processor 120 may be a baseband card in the base station 110. Further, receptacles for receiving digital signal processors 315 may be mounted on the circuit board and coupled to terminals of the processing switch 305. In further embodiments, the interface 300, the interface 310, the packet switch 320, the switching fabric 330, or any combination thereof, may be mounted on the circuit board.

In embodiments including the switching fabric 330, the interface 300 receives a data packet from an RF module 115 and routes the data packet to the processing switch 305 or the switching fabric 330 based on the data packet. For example, the data packet may include a header containing an identifier of the data packet, and the interface 300 may route the data packet to the processing switch 305 or the switching fabric 330 based on the identifier.

The switching fabric 330 routes data packets received from the interface 300 to the interface 310 based on identifiers in the data packets. For example, a data packet received by the switching fabric 330 from the interface 300 may include an identifier, such as a destination address, and the switching fabric 330 may route the data packet to a port of the interface 310 based on the identifier. Additionally, the switching fabric 330 routes data packets received from the interface 310 to the interface 300 based on identifiers in the data packets. For example, the switching fabric 330 may route a data packet to a port of the interface 300 based on an identifier in the data packet. In various embodiments, the switching fabric 330 is a non-blocking switch.

In one embodiment, each of the interface 300 and the interface 310 routes data packets to the processing switch 305 for OFDM processing based on identifiers in the data packets and routes other data packets to the switching fabric 330. For example, the interface 300 may route a data packet to the switching fabric 330, the switching fabric 330 may route the data packet to the interface 310, and the interface 310 may provide the data packet to a destination external of the baseband processor 120 for code division multiple access (CDMA) processing or time division multiple access (TDMA) processing.

Figure 4:
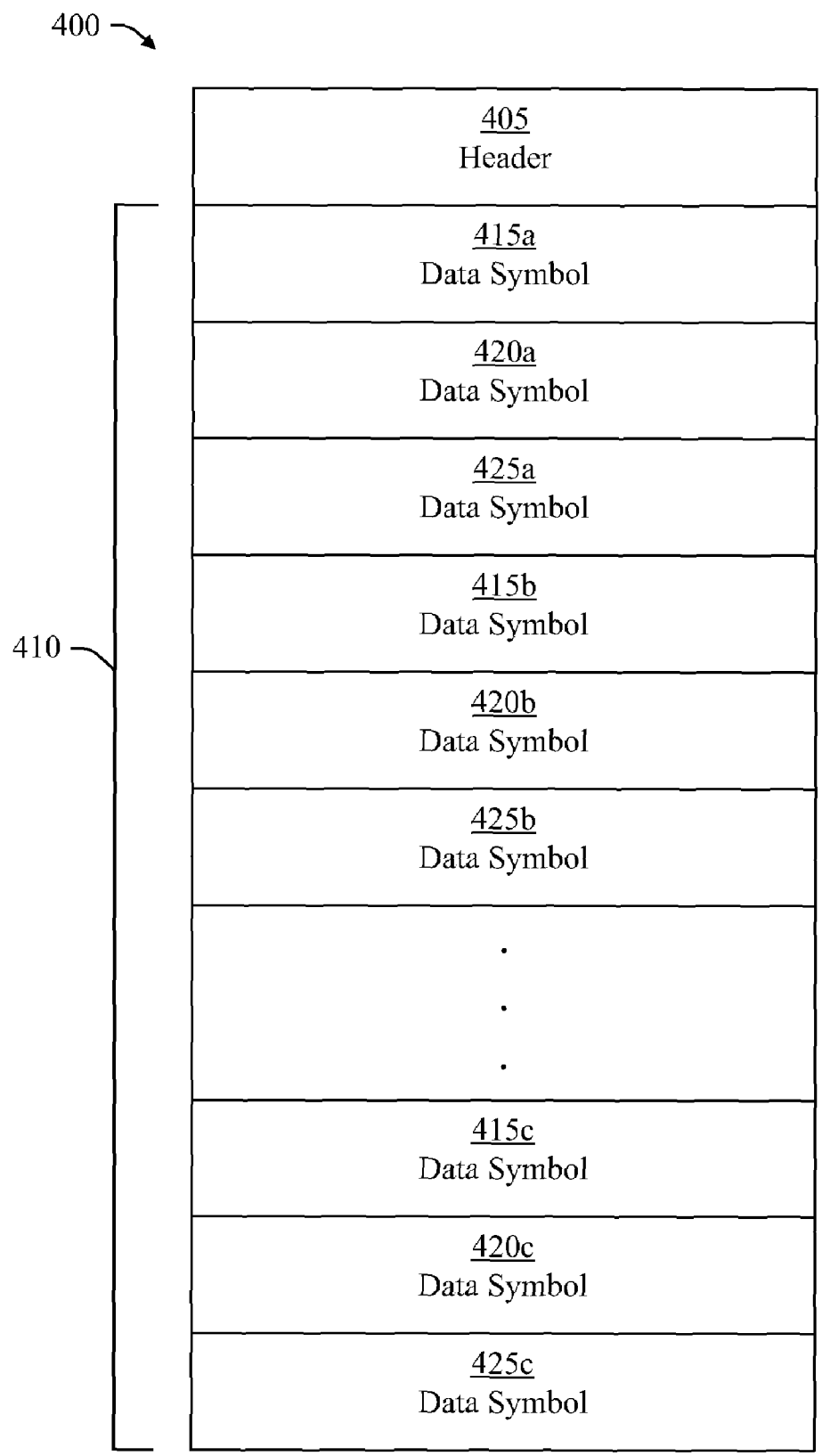
FIG. 4 is a block diagram of a data packet, in accordance with an embodiment of the present invention.

FIG. 4 illustrates a data packet 400, in accordance with an embodiment of the present invention. The data packet 400 illustrated in FIG. 4 is an exemplary symbol data packet generated by the processing switch 305 based on a baseband data packet received by the processing switch 305. The data packet 400 includes a header 405 and a data payload 410. The data payload 410 includes data symbols 415a-c, data symbols 420a-c, and data symbols 425a-c. The data symbols 415a-c are associated with a first communication channel, the data symbols 420a-c are associated with a second communication channel, and the data symbols 425a-c are associated with a third communication channel. As illustrated in FIG. 4, the data symbols (e.g., the data symbols 415a-c, the data symbols 420a-c, and the data symbols 425a-c) are interleaved in the data payload 410. In this way, each of digital signal processor 315 may select the data symbols of a given communication channel based on the position of the data symbols in the data payload 410.

In other embodiments, the data symbols of the communication channels (e.g., the data symbols 415a-c, the data symbols 420a-c, and the data symbols 425a-c) may have other arrangements such that the digital signal processors 315 may select the data symbols of a given communication channel based on the position of the data symbols in the data packet 400. In some embodiments, the header 405 of the data packet 400 includes identifiers for identifying the data symbols of each communication channel in the data packet 400, and the digital signal processors 315 identify the data symbols of the communication channel based on the identifier of the communication channel. For example, the header 405 may include an identifier for identifying a data block containing data symbols associated with a communication channel in the data payload 410 as well as the number of data symbols in the data block.

In another embodiment, the data packet 400 illustrated in FIG. 4 is an exemplary channel data packet received by a digital signal processor 315. The header 405 of this exemplary data packet 400 includes one or more identifiers, each of which identifiers a communication channel associated with the data packet 400. The data payload 410 of the data packet 400 includes data symbols (e.g., data symbols 415a-c, 420a-c, and 425a-c) of each communication channel associated with the data packet 400. In one embodiment, the data packet 400 is associated with a single communication channel and the header 405 includes an identifier of the communication channel.

In some embodiments, the data packet 400 is associated with more than one communication channel and the data symbols of each communication channel are interleaved in the data payload 410 of the data packet 400 based on the communication channels. In this way, a digital signal processor 315 may select a data symbol associated with a communication channel based on the position of the data symbol in the data payload 410. In other embodiments, the data symbols of the communication channels (e.g., the data symbols 415a-c, the data symbols 420a-c, and the data symbols 425a-c) may have other arrangements such that the digital signal processors 315 may select the data symbols of a communication channel based on the position of the data symbols in the data packet 400. In some embodiments, the header 405 of the data packet 400 includes identifiers for identifying the data symbols of given communication channel in the data packet 400, and the digital signal processors 315 identify the data symbols of the communication channel based on the identifiers. For example, the header 405 may include an identifier for identifying a data block containing data symbols associated with a communication channel in the data payload 410 as well as the number of data symbols in the data block.

Figure 5:
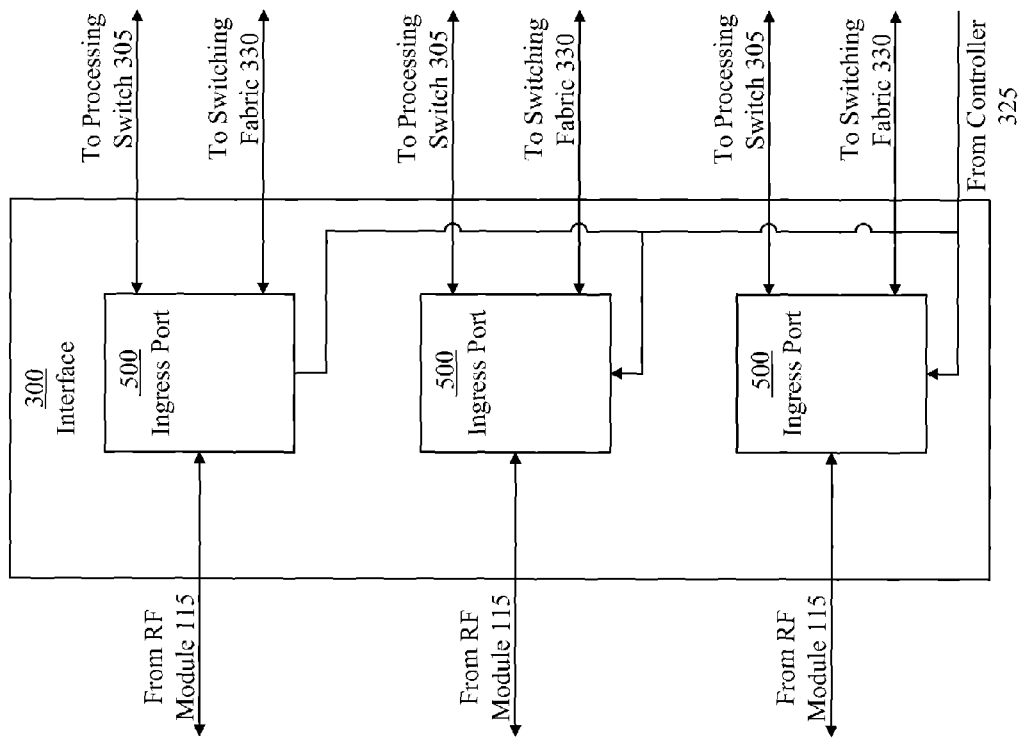
FIG. 5 is a block diagram of an interface, in accordance with an embodiment of the present invention.

FIG. 5 illustrates the interface 300, in accordance with an embodiment of the present invention. The interface 300 includes an ingress port 500 associated with each RF module 115 and coupled to the RF module 115. Additionally, each of the ingress ports 500 is coupled to the processing switch 305, the switching fabric 330, and the controller 325. Although three ingress ports 500 are illustrated in FIG. 5, the interface 300 may have more or fewer ingress ports 500 in other embodiments.

The ingress port 500 receives a data packet from the RF module 115 associated with the ingress port 500 and routes the data packet to the processing switch 305 or the switching fabric 330 based on the data packet. For example, an ingress port 500 may route the data packet to the processing switch 305 or the switching fabric 330 based on an identifier in the data packet. In some embodiments, the ingress port 500 may store data packets before routing the data packet to the processing switch 305 or the switching fabric 330. For example, the ingress port 500 may include a data queue for storing data packets in the order the ingress port 500 received the data packets.

In one embodiment, the ingress ports 500 are programmable by the controller 325 of the baseband processor 120. In this embodiment, the controller 325 programs the ingress ports 500 to control routing of the data packets from the ingress ports 500 to the processing switch 305 or the switching fabric 330. For example, the controller 325 may program an ingress port 500 to route data packets including a given identifier to the processing switch 305 or the switching fabric 330 based on the identifier.

Figure 6:
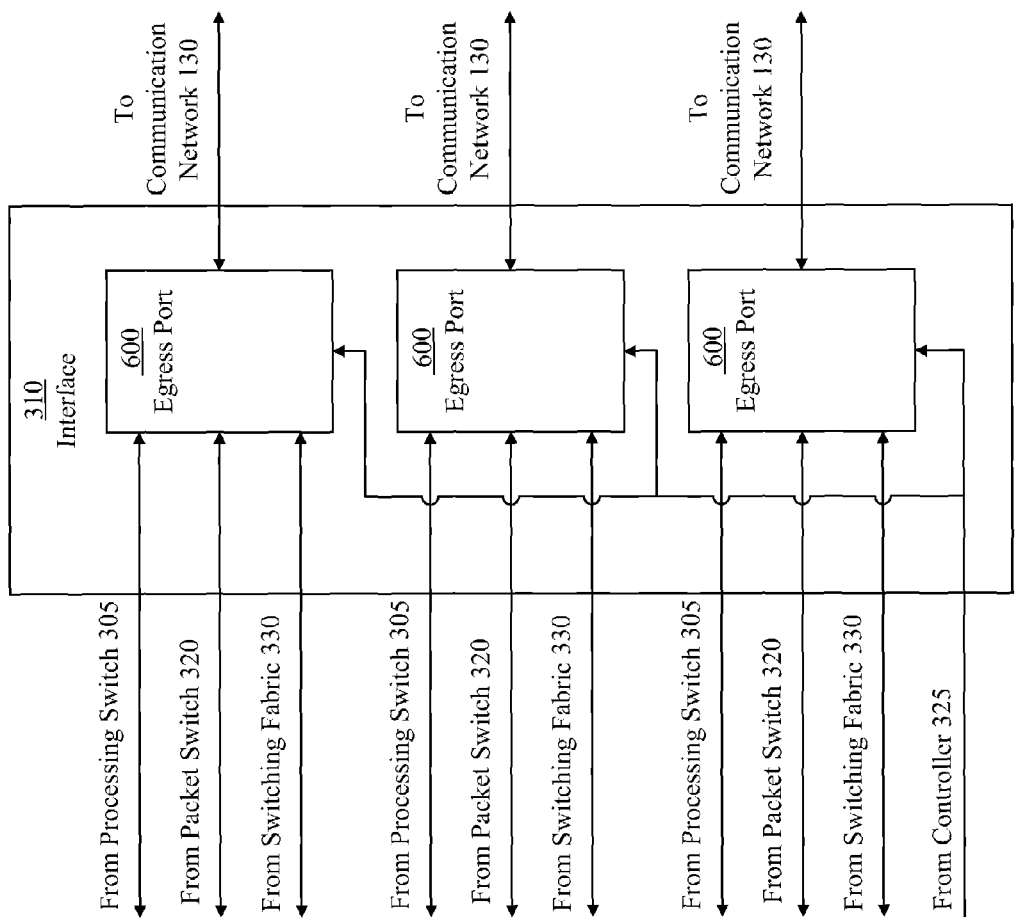
FIG. 6 is a block diagram of an interface, in accordance with an embodiment of the present invention.

FIG. 6 illustrates the interface 310, in accordance with an embodiment of the present invention. The interface 310 includes egress ports 600 coupled to the communication network 130, for example through the back haul 125. Additionally, each of the egress ports 600 is coupled the processing switch 305, the switching fabric 330, and the controller 325 of the baseband processor 120. Although three egress ports 600 are illustrated in FIG. 6, the interface 310 may have more or fewer egress ports 600 in other embodiments.

The egress port 600 receives data packets from the processing switch 305, the packet switch, 320, or the switching fabric 330 and transmits (e.g., forwards) the data packets to the communication network 130. Additionally, each egress port 600 receives data packets from the communication network 130 and routes the data packets to the processing switch 305, the packet switch 320, or the switching fabric 330 based on the data packets. For example, an egress port 600 may route a data packet to the processing switch 305, the packet switch 320, or the switching fabric 330 based on an identifier in the data packet. In some embodiments, the egress port 600 may store data packets received from the communication network 130 before routing the data packet to the processing switch 305, the packet switch 320, or the switching fabric 330. For example, the egress port 600 may include a data queue for storing data packets in the order the egress port 600 receives the data packets.

In one embodiment, the egress ports 600 are programmable by the controller 325 of the baseband processor 120. In this embodiment, the controller 325 programs the egress ports 600 to control routing of the data packets from the egress ports 600 to the processing switch 305, the packet switch 320, or the switching fabric 330. For example, the controller 325 may program an egress port 600 to route data packets including a given identifier to the processing switch 305, the packet switch 320, or the switching fabric 330 based on the identifier.

Figure 7:
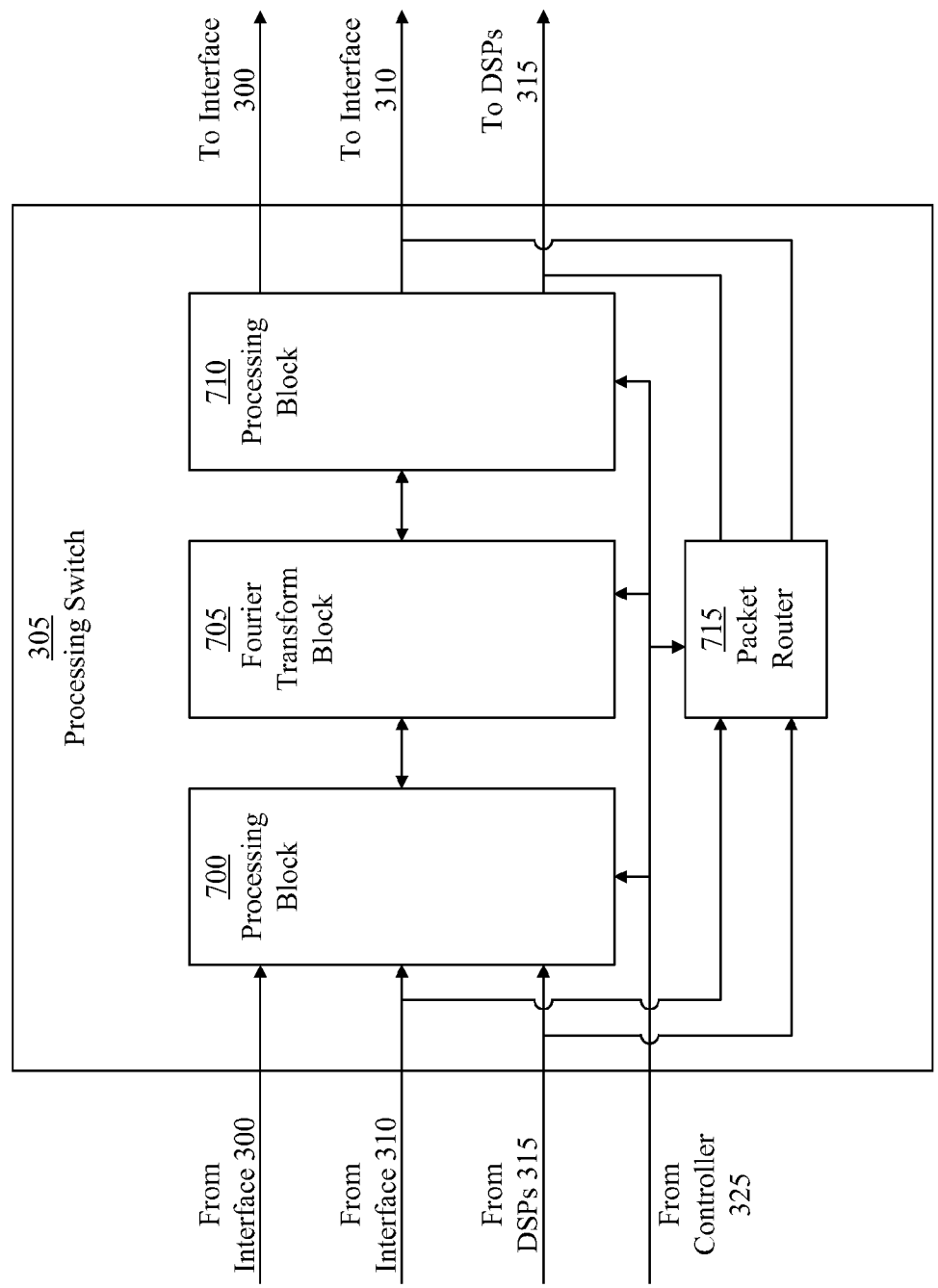
FIG. 7 is a block diagram of a processing switch, in accordance with an embodiment of the present invention.

FIG. 7 illustrates the processing switch 305, in accordance with an embodiment of the present invention. The processing switch 305 includes a processing block 700, a Fourier transform block 705, a processing block 710, and a packet router 715. The processing block 700 is coupled to the interface 300, the interface 310, the digital signal processors 315, the controller 325, the Fourier transform block 705, and the packet router 715. The processing block 710 is coupled to the interface 300, the interface 310, the digital signal processors 315, the Fourier transform block 705, and the packet router 715. Additionally, the packet router 715 is coupled to the interface 310, the digital signal processors 315, and the controller 325. Each of the processing block 700, the Fourier transform block 705, and the processing block 710 performs OFDM operations on data packets received by the processing switch 305 from the interface 300 or the interface 310. The packet router 715 routes data packets received by the processing switch 305 from the digital signal processors 315 to the interface 310. Additionally, the packet router 715 routes data packets received by the processing switch 305 from the interface 310 to the digital signal processors 315.

The processing block 700 receives a baseband data packet from the interface 300, and selects the data packet based on an identifier in the data packet. For example, the baseband data packet may include a header containing the identifier, and the processing block 700 may select the data packet based on the identifier. The baseband data packet also includes a data payload including a baseband input representing a baseband signal. The processing block 700 converts the baseband input to parallel data by performing OFDM operations on the baseband input and provides the parallel data to the Fourier transform block 705. For example, the baseband input may be a serial bit stream represented by successive data bytes in the data payload and the processing block 700 may convert the serial bit stream to a parallel bit stream by performing one or more OFDM operations on the serial bit stream. The parallel data stream may include data units, such as data bytes or data words, each of which include a data bit in each of the communication channels. Additionally, the processing block 700 provides the parallel bit stream to the Fourier transform block 705.

The Fourier transform block 705 performs one or more OFDM operations on the parallel data to generate data symbols of the communication channels in the baseband signal. The OFDM operations performed on the parallel data by the Fourier transform block 705 includes performing a Fourier transform on the parallel data. For example, the parallel bits steams may include data units representing coefficients of the Fourier transform. The Fourier transform block 705 may perform the Fourier transform on the parallel data by performing a Fast Fourier Transform (FFT), an Inverse Fast Fourier Transform (IFFT), a Discrete Fourier Transform (DFT), or an Inverse Discrete Fourier transform (IDFT) to generate the data symbols of the communication channels.

The processing block 710 generates a symbol data packet based on the data symbols generated by the Fourier transform block 705. The processing block 710 may also perform additional OFDM operations on the data symbols. For example, the processing block 710 may perform a channel estimation operation on the data symbols. The processing block 710 provides the symbol data packet generated by the processing block 710 to the digital signal processors 315. In turn, the digital signal processors 315 generate channel data packets by performing symbol processing operations on the data symbols of channel data packet received from the processing block 710 and provide the channel data packets to the processing switch 305. Each of the data packets generated by the digital signal processors 315 is associated with a communication channel and includes an identifier of the communication channel. For example, each of the channel data packets generated by the digital signal processors 315 may include a header containing an identifier of the communication channel associated with the data packet.

The packet router 715 identifies the channel data packets received by the processing switch 305 from the digital signal processors 315 based on the identifiers in the data packets. Additionally, the packet router 715 routes each of the channel data packets to the interface 310 based on the identifier in the channel data packet. In turn, the interface 310 transmits the data packet to the communication network 130, for example through the back haul 125. In one embodiment, the packet router 715 determines whether a channel data packet received by the processing switch 305 from a digital signal processor 315 requires further processing based on the header of the channel data packet. If the channel data packet requires further processing, the packet router 715 routes the channel data packet to one or more of the digital signal processor 315 for further processing.

Additionally, the processing switch 305 receives channel data packets from the interface 310, each of which includes a header and a data payload. The header of each channel data packet received by the processing switch 305 includes an identifier identifying a communication channel associated with the data packet. The data payload of the channel data packet includes data symbols of the communication channel. The packet router 715 provides the channel data packets received from the interface 310 to the digital signal processors 315. In one embodiment, the packet router 715 provides each of the data packets to the digital signal processors 315 by broadcasting the data packet to the digital signal processors 315. In another embodiment, the packet router 715 provides the channel data packets to the digital signal processors 315 by routing each of the channel data packets to one or more of the digital signal processors 315 based on the identifier in the channel data packet.

One or more of the digital signal processors 315 selects a channel data packet received from the packet router 715 based on the identifier of the communication channel in the channel data packet. In one embodiment, the controller 325 programs each digital signal processor 315 to select a channel data packet based on an identifier of a communication channel in the channel data packet. In this way, the digital signal processor 315 is associated with the channel data packet. The digital signal processor 315 performs one or more symbol processing operations on the data symbols of the channel data packet selected by the digital signal processor 315, generates a symbol data packet including the processed data symbols and the identifier of the communication channel, and provides the symbol data packet to the processing switch 305.

The processing block 700 receives the symbol data packets from the digital signal processors 315 and selects the symbol data packets, for example based on the identifiers of the communication channels in the symbol data packets or status data in symbol data packets. Further, the processing block 700 provides the processed data symbols in the selected symbol data packets to the Fourier transform block 705. Additionally, the processing block 700 may perform one or more OFDM operations on the processed data symbols in the selected symbol data packets. For example, the processing block 700 may generate data symbols for a pilot channel based on the processed data symbols and provide the data symbols of the pilot channel to the Fourier transform block 705. In this way, the processing block 700 inserts the data symbols of the pilot channel into the processed data symbols received by the Fourier transform block 705 from the processing block 700.

The Fourier transform block 705 generates data blocks (e.g., parallel data) by performing one or more OFDM operations on the data symbols received from the processing block 700, which includes performing a Fourier transform on the data symbols. For example, the Fourier transform block 705 may perform a Fast Fourier Transform (FFT), an Inverse Fast Fourier Transform (IFFT), a Discrete Fourier Transform (DFT), or an Inverse Discrete Fourier Transform on the data symbols to generate the data blocks, each of which represents a coefficient of a sinusoidal frequency (e.g., a sine or cosine frequency component of a subcarrier signal). The data blocks generated by the Fourier transform block 705 represents data in the communication channels associated with the symbol data packets selected by the processing block 700 and may also represent data in the pilot channel generated by the processing block 700. Additionally, the Fourier transform block 705 provides the data blocks to the processing block 710.

The processing block 710 generates a baseband data packet by performing one or more OFDM operations on the data blocks received from the Fourier transform block 705. The data payload of the baseband data packet generated by the processing block 710 includes a baseband output, which represents a baseband signal including the communication channels associated with the data packets selected by the processing block 700. The data baseband output may also represent other data associated with the communication channels, for example a pilot channel associated with the communication channels. The processing block 710 provides the baseband data packet generated to the interface 300. In turn, the interface 300 provides the baseband data packet to one of the RF modules 115, for example based on an identifier in a header of the baseband data packet. The RF module 115 receiving the baseband data packet from the interface 300 converts the baseband output of the data packet to a radio-frequency (RF) signal, which includes sub-carrier signals carrying the communication channels of the baseband signal represented by the baseband output. Further, the RF module 115 transmits the RF signal from the antenna 105.

Figure 8:
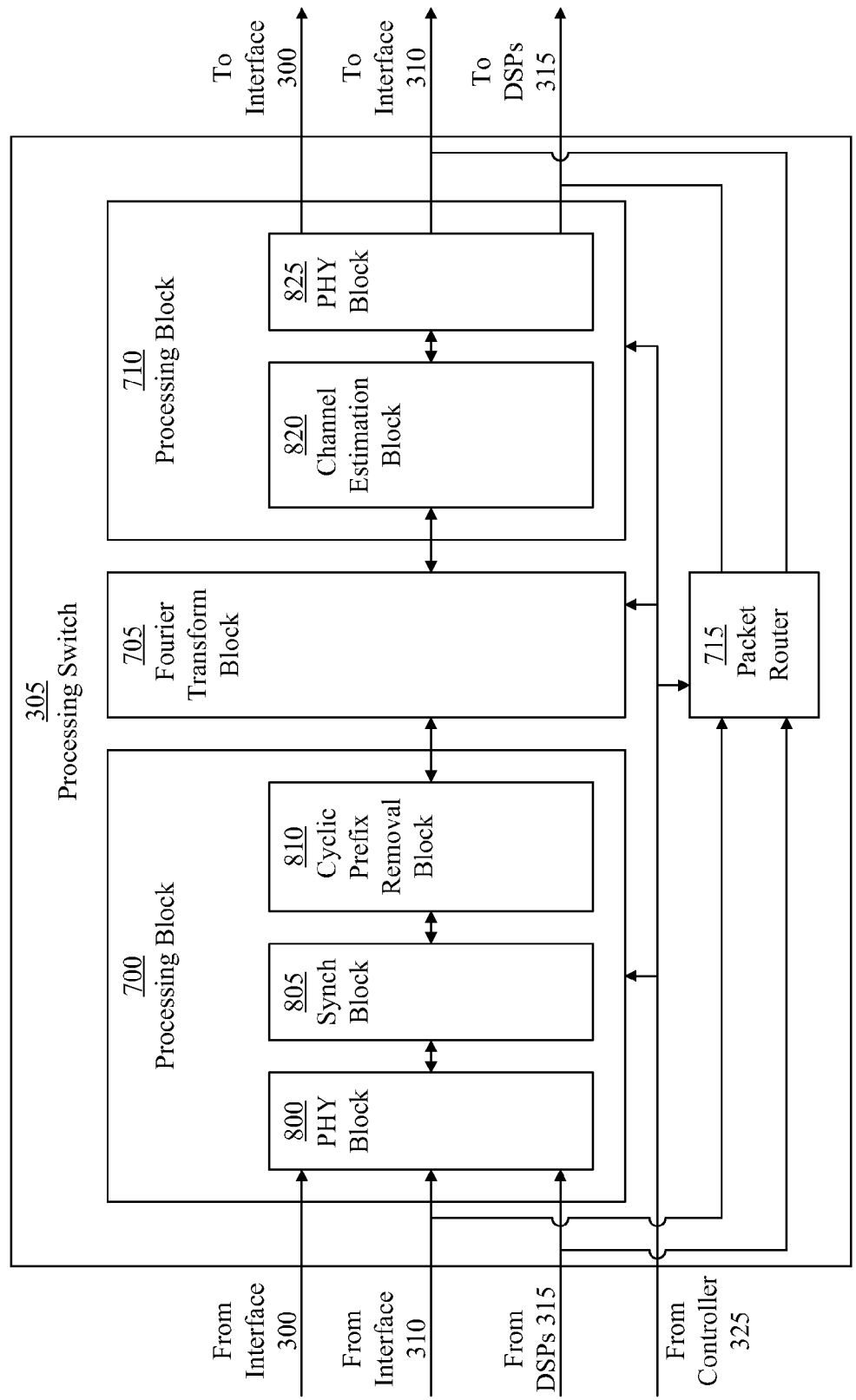
FIG. 8 is a block diagram of a processing switch, in accordance with an embodiment of the present invention.

FIG. 8 illustrates the processing switch 305, in accordance with an embodiment of the present invention. The processing block 700 of the processing switch 305 includes a physical block (PHY Block) 800, a synchronization block (Synch Block) 805, and a cyclic prefix removal block 810. The physical block 800 is coupled to the interface 300, the interface 310, the digital signal processors 315, and the synchronization block 805. The cyclic prefix removal block 810 is coupled to the synchronization block 805 and the Fourier transform block 705. The processing block 710 includes a channel estimation block 820 and a physical block (PHY Block) 825. The channel estimation block 820 is coupled to the Fourier transform block 705 and the physical block 825. Additionally, the physical block 825 is coupled to the interface 300, the interface 310, and the digital signal processors 315.

The physical block 800 of the processing block 700 receives a baseband data packet from the interface 310. The baseband data packet received by the physical block 800 includes a baseband input representing a baseband signal including communication channels. The physical block 800 coverts the baseband input of the baseband data packet to a bit stream by performing one or more OFDM operations on the baseband input. The bit stream includes data bits representing data in the communication channels of the baseband signal represented by the baseband input.

The synchronization block 805 receives the bit stream from the physical block 800 and synchronizes the data bits of the bit stream to a bit rate. For example, the synchronization block 805 may synchronize the bit stream by sampling the data bits of the bit stream at a predetermined bit rate.

In various embodiments, the synchronization block 805 is programmable to synchronize the bit stream received from the physical block 800. For example, the synchronization block 805 may select a bit rate and sample the bit stream received from the physical block 800 at the selected bit rate to synchronize the bit stream. Moreover, the controller 325 may program the synchronization block 805 to synchronize the bit stream received from the physical block 800, for example based on user input (e.g., parameters) supplied to the controller 325 through the interface 310. Thus, a user may provide parameters to the processing switch 305 specifying an algorithm (e.g., a user defined algorithm) to be performed by the synchronization block 805.

In some embodiments, the synchronization block 805 is optional. In these embodiments, the digital signal processors 315 synchronize the bit stream generated by the physical block 800. For example, the processing switch 305 may generate a symbol data packet including the generated bit stream and provide the symbol data packet to the digital signal processors 315. In turn, one or more of the digital signal processors 315 may sample the bit stream in the symbol data packet received from the processing switch 305, generate one or more symbol data packets including the synchronized bit stream, and provide each of the symbol data packets including the synchronized bit stream to the processing switch 305 for further processing. In these embodiments, the digital signal processors 315 perform one or more symbol processing operations to synchronize the bit stream.

The cyclic prefix removal block 810 receives the bit stream from the synchronization block 805 and removes data bits representing cyclic prefixes of the communication channels from the bit stream. Additionally, the cyclic prefix removal block 810 converts the remaining data bits into data blocks (e.g., parallel data) and provides the data blocks to the Fourier transform block 705.

In various embodiments, the cyclic prefix removal block 810 is programmable to remove cyclic prefixes of the communication channels from the bit stream received from the synchronization block 805. For example, the controller 325 may select a cyclic prefix size for performing cyclical prefix removal on the bit stream received from the synchronization block 805. Example cyclic prefix sizes include one-quarter, one-eighth, one-sixteenth, or one-thirty-second of the size of a data block generated by the cyclic prefix removal block 810. Moreover, the controller 325 may program the cyclic prefix removal block 810 to remove cyclic prefixes from the communication channels, for example based on user input (e.g., parameters) supplied to the controller 325 through the interface 310. Thus, a user may provide parameters to the processing switch 305 specifying an algorithm (e.g., a user defined algorithm) to be performed by the cyclic prefix removal block 810.

In some embodiments, the cyclic prefix removal block 810 is optional. In these embodiments, the digital signal processors 315 remove cyclic prefixes from the communication channels. For example, the processing switch 305 may generate a symbol data packet including the synchronized bit stream and provide the symbol data packet to the digital signal processors 315. In turn, one or more of the digital signal processors 315 may remove cyclic prefixes of the communication channels in the synchronized bit stream, convert the remaining data bits of the synchronized bit stream into data blocks, generate one or more symbol data packets including the data blocks, and provide the symbol data packets including the data blocks to the processing switch 305 for further processing. In these embodiments, the digital signal processors 315 perform one or more symbol processing operations to remove the cycle prefixes from the communication channels.

The Fourier transform block 705 receives the data blocks (e.g., from the processing block 700) and generates data symbols by performing a Fourier transform operation (e.g., an OFDM operation) on the data blocks. The data blocks represent coefficients of the Fourier transform operation, and the data symbols represent data in the communication channels of the baseband signal. In various embodiments, the Fourier transform block 705 performs the Fourier transform operation by performing a Fast Fourier Transform (FFT) operation, an Inverse Fast Fourier Transform (IFFT), a Discrete Fourier Transform (DFT), or an Inverse Discrete Inverse Fourier Transform (IDFT). Additionally, the Fourier transform block 705 provides the data symbols to the channel estimation block 820 of the processing block 710.

In various embodiments, the Fourier transform block 705 is programmable to perform one or more Fourier transforms on the received data blocks. For example, the Fourier transform block 705 may select a Fourier transform and a point size of the Fourier transform to be performed by the Fourier transform block 705. Example point sizes of a Fourier transform include two-hundred fifty-six, five-hundred twelve, one-thousand twenty-four, or two-thousand forty-eight. As another example, the Fourier transform block 705 may select a number of Fourier transforms to perform on the data symbol streams. Moreover, the controller 325 may program the Fourier transform block 705 to perform the Fourier transform, for example based on user input (e.g., parameters) supplied to the controller 325 through the interface 310. Thus, a user may provide parameters to the processing switch 305 specifying an algorithm (e.g., a user defined algorithm) to be performed by the Fourier transform block 705.

The channel estimation block 820 receives the data symbols from the Fourier transform block 705 and generates a channel estimation for each communication channel based on the data symbols of the communication channel. The channel estimation of a communication channel is an estimation of the frequency response of the communication channel. The channel estimation block 820 provides the data symbols and the channel estimations to the physical block 825.

In various embodiments, the channel estimation block 820 is programmable to generate channel estimations for the communication channels. For example, the channel estimation block 820 may select a channel estimation algorithm and perform the channel estimation algorithm on the data symbols received from the Fourier transform block 705 to generate channel estimations of the communication channels. Example channel estimation algorithms include a linear channel estimation algorithm, a non-linear channel estimation algorithm, or a minimum mean square error (MMSE) channel estimation algorithm. Moreover, the controller 325 may program the channel estimation block 820 to generate the channel estimations of the communication channels, for example based on user input (e.g., parameters) supplied to the controller 325 through the interface 310. Thus, a user may provide parameters to the processing switch 305 specifying an algorithm (e.g., a user defined algorithm) to be performed by the channel estimation block 820.

In some embodiments, the channel estimation block 820 is optional. In these embodiments, the digital signal processors 315 generate the channel estimations of the communication channels. For example, the processing switch 305 may generate a symbol data packet including the data symbols generated by the Fourier transform block 705 and provide the symbol data packet to the digital signal processors 315. In turn, one or more of the digital signal processors 315 may generate the channel estimations of the communication channels, generate one or more symbol data packets including the channel estimations, and provide the symbol data packets including the channel estimations to the processing switch 305 for further processing. In these embodiments, the digital signal processors 315 perform one or more symbol processing operations to generate the channel estimations.

The physical block 825 generates a symbol data packet based on both the data symbols generated by the Fourier transform block 705 and the channel estimations. The symbol data packet generated by the physical block 825 includes a header and a data payload. The header includes an identifier of the symbol data packet and may also include status data for the symbol data packet. For example, the status data may indicate a number of times the symbol data packet is to be successively processed by the digital signal processors 315. The data payload of the symbol data packet generated by the physical block 825 includes the data symbols and the channel estimations of the communication channels.

Additionally, the physical block 825 provides the symbol data packet to digital signal processors 315, for example by broadcasting the symbol data packet to the digital signal processors 315. In turn, one or more of the digital signal processors 315 selects the data symbols and the channel estimation of a communication channel in the symbol data packet and generates a channel data packet associated with the communication channel by performing one or more symbol processing operations on the selected data symbols and channel estimation. The channel data packet includes a header including an identifier identifying the communication channel and a data payload including the processed data symbols and channel estimation of the communication channel. Additionally, the header of the channel data packet may include control data indicating further processing to be performed on the channel data packet by the processing switch 305 or the digital signal processors 315, or both.

Each of the digital signal processors 315 generating a channel data packet provides the channel data packet to the processing switch 305 for further processing. Further processing of a channel data packet in the processing switch 305 may include routing the channel data packet to the interface 310. Alternatively, further processing of a channel data packet in the processing switch 305 may include providing the channel data packet to the digital signal processors 315 for additional processing by the digital signal processors 315. For example, the processing switch 305 may broadcast the channel data packet to the digital signal processors 315 for additional processing based on control data in the channel data packet.

In various embodiments, the data symbols and the channel estimations of the communication channels are interleaved in the data payload of the symbol data packet generated by the processing switch 305 such that the digital signal processors 315 may select the data symbols and the channel estimation of a given communication channel based on the position of the data symbols and the channel estimation in the data payload of the symbol data packet. In other embodiments, the status data identifies the data symbols and the channel estimation of each communication channel in the symbol data packet, and the digital signal processors 315 select the data symbols and the channel estimation of a given communication channel in the symbol data packet based on the status data.

Figure 9:
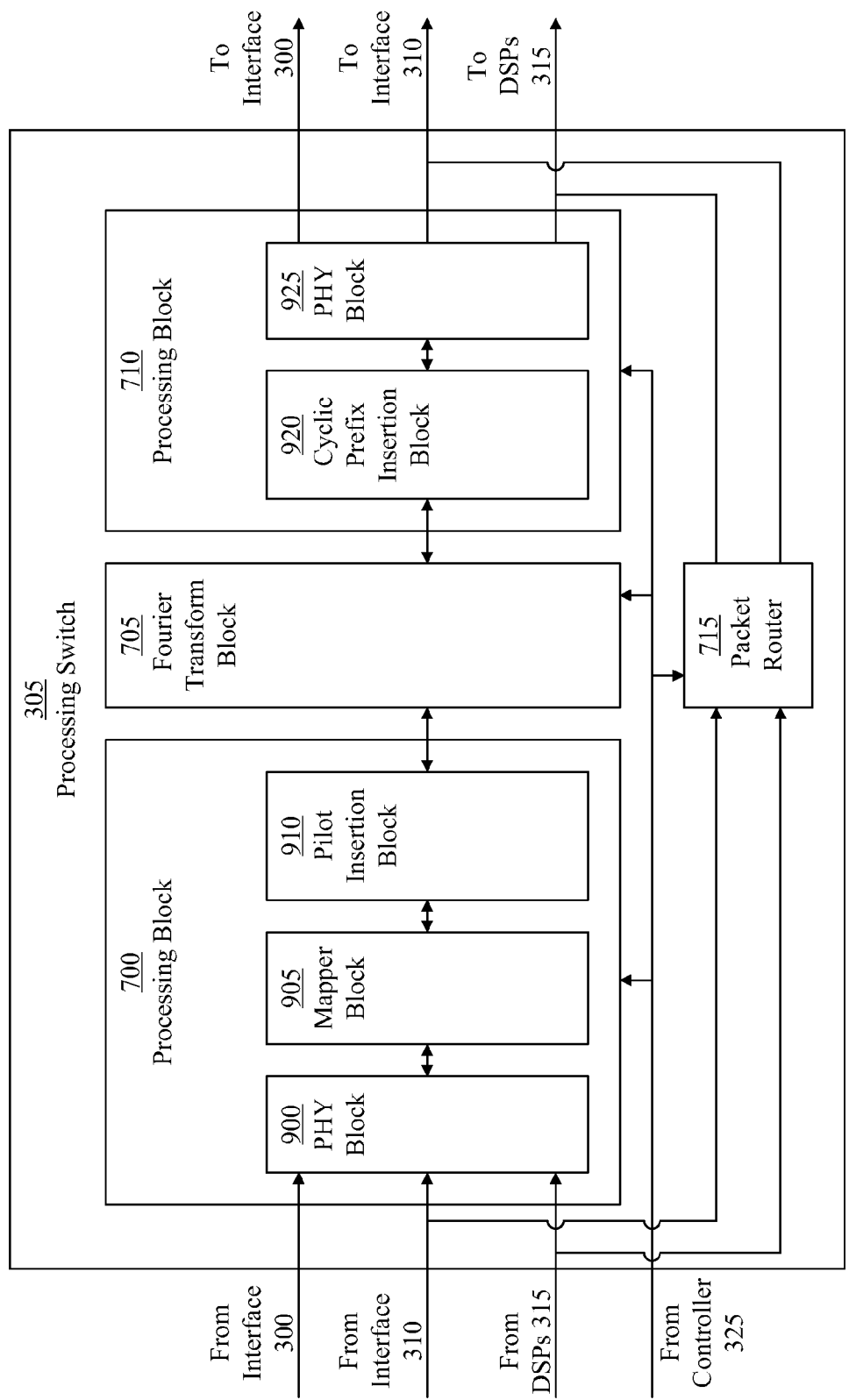
FIG. 9 is a block diagram of a processing switch, in accordance with an embodiment of the present invention.

FIG. 9 illustrates the processing switch 305, in accordance with an embodiment of the present invention. In this embodiment, the processing block 700 includes a physical block (PHY Block) 900, a mapper block 905, and a pilot insertion block 910. The physical block 900 is coupled to the interface 300, the interface 310, the digital signal processors 315, and the mapper block 905. The pilot insertion block 910 is coupled to the mapper block 905 and the Fourier transform block 705. The processing block 710 includes a cyclic prefix insertion block 920 and a physical block (PHY Block) 925. The cyclic prefix insertion block 920 is coupled to the Fourier transform block 705 and the physical block 925. Additionally, the physical block 925 is coupled to the interface 300, the interface 310, and the digital signal processors 315.

The physical block 900 of the processing block 700 receives channel data packets from the interface 310 or the digital signal processors 315. Each of the channel data packets received by the physical block 900 includes a header and a data payload. The header of each channel data packet includes an identifier identifying a communication channel associated with the channel data packet. The data payload of each channel data packet includes data symbols representing data in the communication channel associated with the channel data packet. The physical block 900 coverts the data payload of each channel data packet to a bit stream, which includes data bits representing data symbols in the channel data packet. Additionally, the physical block 900 provides the bit streams (e.g., parallel bits streams) to the mapper block 905.

The mapper block 905 maps (e.g., converts) the bits streams received from the physical block 900 into data symbols streams (e.g., parallel streams of data symbols). Each of the data symbol streams is associated with a communication channel and includes data symbols of the communication channel. Additionally, the mapper block 905 provides the data symbol streams to the pilot insertion block 910.

In various embodiments, the mapper block 905 is programmable to map the bits streams received from the physical block 900 into data symbol streams. For example, the mapper block 905 may select a modulation algorithm, such as a bipolar phase shift keying (BPSK) algorithm, a quadrature amplitude modulation (QAM) algorithm, or a phase shift keying (PSK) algorithm, and map the bit streams received from the physical block 900 into the data symbol streams by performing the selected modulation algorithm on the bit streams. Example modulation algorithms include four, eight, sixteen, thirty-two, or sixty-four level PSK algorithms. Other example modulation algorithms include four, eight, sixteen, thirty-two, or sixty-four level QAM algorithms. Moreover, the controller 325 may program the mapper block 905 to map the bit streams received from the physical block 900 into data symbol streams, for example based on user input (e.g., parameters) supplied to the controller 325 through the interface 310. Thus, a user may provide parameters to the processing switch 305 specifying an algorithm (e.g., a user defined algorithm) to be performed by the mapper block 905.

In some embodiments, the mapper block 905 is optional. In these embodiments, the digital signal processors 315 map the bit streams generated by the physical block 900 into data symbol streams. For example, the processing switch 305 may generate a symbol data packet including the bit streams generated by the physical block 900 and provide the symbol data packet to the digital signal processors 315. In turn, one or more of the digital signal processors 315 may map the bit streams into data symbol streams, generate one or more symbol data packets including the data symbol streams, and provide the symbol data packets including the data symbol streams to the processing switch 305 for further processing. In these embodiments, the digital signal processors 315 perform one or more symbol processing operations to generate the symbol data streams.

The pilot insertion block 910 generates data symbols for a pilot channel and generates a data symbol stream including the data symbols. Additionally, the pilot insertion block 910 provides the data symbol streams received from the mapper block 905 and the data symbol stream of the pilot channel to the Fourier transform block 705. In this way, the pilot insertion block 910 inserts the pilot channel into the communication channels.

In various embodiments, the pilot insertion block 910 is programmable to insert a pilot channel into the communication channels. For example, the Fourier transform block 705 may perform a Fourier transform of a given point size (e.g., a 1024 point FFT), and the mapper block 905 may select a point of the Fourier transform and generate a data symbol stream of a pilot channel for the selected point. Moreover, the controller 325 may program the pilot insertion block 910 to generate the pilot channel and insert the pilot channel into the communication channels, for example based on user input (e.g., parameters) supplied to the controller 325 through the interface 310. Thus, a user may provide parameters to the processing switch 305 specifying an algorithm (e.g., a user defined algorithm) to be performed by the pilot insertion block 910.

In some embodiments, the pilot insertion block 910 is optional. In these embodiments, the digital signal processors 315 generate the pilot channel. For example, the processing switch 305 may generate a symbol data packet including the data symbol streams generated by the mapper block 905 and provide the symbol data packet to the digital signal processors 315. In turn, one or more of the digital signal processors 315 may generate the pilot channel based on the symbol data streams, generate one or more symbol data packets including the pilot channel (e.g., a symbol data stream), and provide the symbol data packets including the pilot channel to the processing switch 305 for further processing. In these embodiments, the digital signal processors 315 perform one or more symbol processing operations to generate the pilot channel.

The Fourier transform block 705 receives the data symbol streams, including the data symbol streams associated with the communication channels and the pilot channel. Further, the Fourier transform block 705 generates data blocks by performing a Fourier transform operation (e.g., an OFDM operation) on the data symbols streams. The data symbols in the data symbol streams (e.g., parallel data symbol streams) represent coefficients of the Fourier transform operation, and the data blocks represent data in a baseband signal including the communication channels and the pilot channel. In various embodiments, the Fourier transform block 705 performs the Fourier transform operation by performing a Fast Fourier Transform (FFT) operation, an Inverse Fast Fourier Transform (IFFT), a Discrete Fourier Transform (DFT), or an Inverse Discrete Inverse Fourier Transform (IDFT). Additionally, the Fourier transform block 705 provides the data blocks to the cyclic prefix insertion block 920.

In various embodiments, the Fourier transform block 705 is programmable to perform one or more Fourier transforms on the data symbols streams. For example, the Fourier transform block 705 may select a Fourier transform and a point size of the Fourier transform to be performed by the Fourier transform block 705. Example point sizes of a Fourier transform include two-hundred fifty-six, five-hundred twelve, one-thousand twenty-four, or two-thousand forty-eight. As another example, the Fourier transform block 705 may select a number of Fourier transforms to perform on the data symbol streams. Moreover, the controller 325 may program the Fourier transform block 705 to perform the Fourier transform, for example based on user input (e.g., parameters) supplied to the controller 325 through the interface 310. Thus, a user may provide parameters to the processing switch 305 specifying an algorithm (e.g., a user defined algorithm) to be performed by the Fourier transform block 705.

The cyclic prefix insertion block 920 inserts cyclic prefixes into the data blocks received from the Fourier transform block 705. Further, the cyclic prefix insertion block 920 provides the data blocks, including the cyclic prefixes, to the physical block 925.

In various embodiments, the cyclic prefix insertion block 920 is programmable to perform a cyclic prefix insertion into the data blocks received from the Fourier transform block 705. For example, the cyclic prefix insertion block 920 may select a cyclic prefix size for performing cyclical prefix insertions on the data blocks received from the Fourier transform block 705. Example cyclic prefix sizes include one-quarter, one-eighth, one-sixteenth, or one-thirty-second of the size of a data block received from the Fourier transform block 705. Moreover, the controller 325 may program the cyclic prefix insertion block 920 to insert cyclic prefixes into the data blocks, for example based on user input (e.g., parameters) supplied to the controller 325 through the interface 310. Thus, a user may provide parameters to the processing switch 305 specifying an algorithm (e.g., a user defined algorithm) to be performed by the cyclic prefix insertion block 920.

In some embodiments, the cyclic prefix insertion block 920 is optional. In these embodiments, the digital signal processors 315 generate cyclic prefixes and insert the cyclic prefixes into the data blocks generated by the Fourier transform block 705. For example, the processing switch 305 may generate a symbol data packet including the data blocks generated by the Fourier transform block 705 and provide the symbol data packet to the digital signal processors 315. In turn, one or more of the digital signal processors 315 may generate cyclic prefixes and insert the cyclic prefixes into the data blocks of the symbol data packet received from the processing switch 205, generate one or more symbol data packets including the processed data blocks, and provide the symbol data packets including the processed data blocks to the processing switch 305 for further processing. In these embodiments, the digital signal processors 315 perform one or more symbol processing operations to insert the cyclic prefixes into the data blocks generated by the Fourier transform block 705.

The physical block 925 receives the data blocks (e.g., from the cyclic prefix insertion block 920) and converts the data blocks into a baseband output representing a baseband signal. For example, the baseband output may be a bit stream representing the baseband signal. Further, the physical block 925 generates a baseband data packet based on the baseband output, which includes a header and a data payload. The header of the baseband data packet includes an identifier of the packet, and the data payload of the baseband data packet includes the baseband output. For example, the baseband output may include data bytes of the bit stream. The physical block 925 provides the baseband data packet to the interface 300, and the interface 300 routes the baseband data packet to one of the RF modules 115 based on the identifier of the data packet. In turn, the RF module 115 converts the baseband output in the baseband data packet to a radio-frequency (RF) signal, which includes sub-carrier signals carrying the communication channels, and transmits the RF signal from the antenna 105.

In various embodiments, the processing block 700 includes the physical block 800, the synchronization block 805, the cyclic removal block 810, the physical block 900, the mapper block 905, and the pilot insertion block 910. Further, the processing block 710 includes the channel estimation block 820, the physical block 825, the cyclic prefix insertion block 920, and the physical block 925. In other embodiments, the processing block 700 includes the physical block 800, the synchronization block 805, the cyclic removal block 810, the cyclic prefix insertion block 920, and the physical block 925. Further, the processing block 710 includes the channel estimation block 820, the physical block 825, the physical block 900, the mapper block 905, and the pilot insertion block 910.

Figure 10:
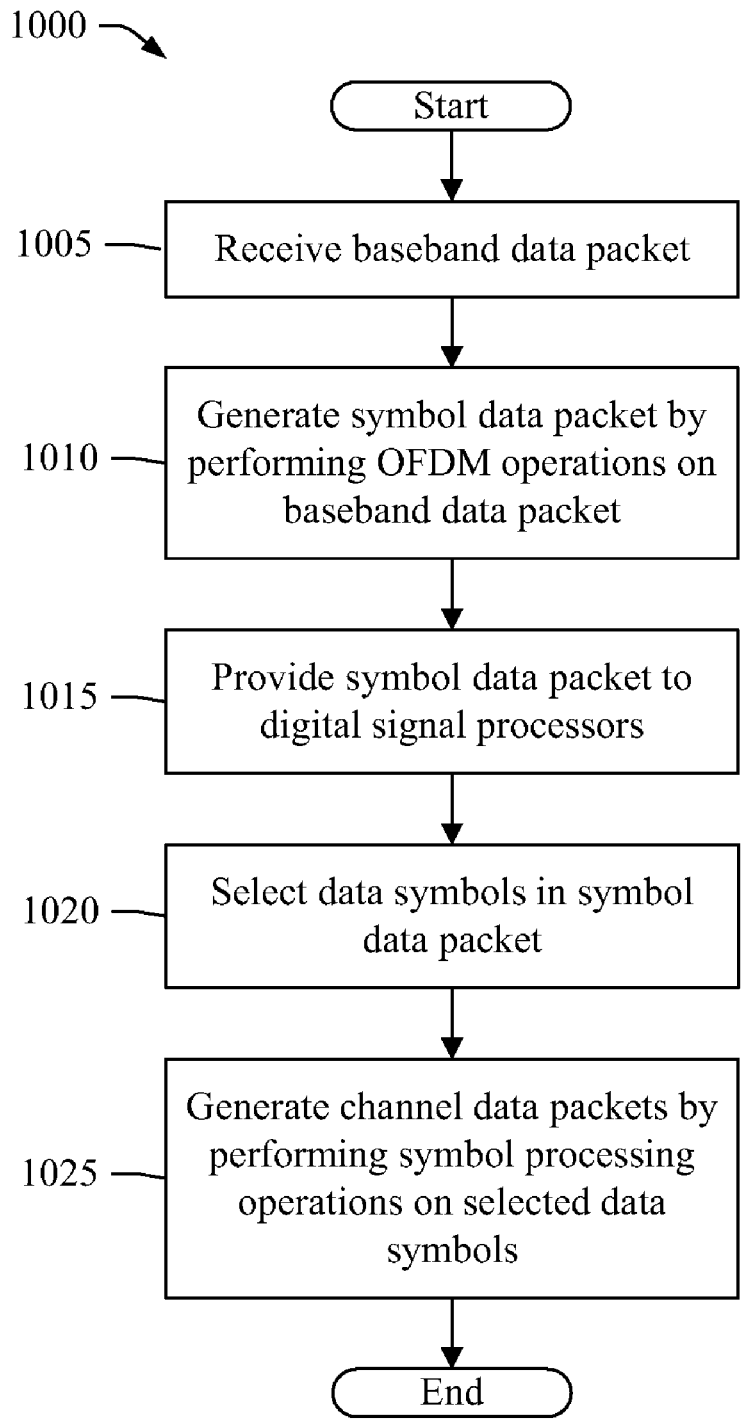
FIG. 10 is a flow chart of a method of processing data in a wireless communication system, in accordance with an embodiment of the present invention.

FIG. 10 illustrates a method 1000 of processing data in a wireless communication system, in accordance with an embodiment of the present invention. In step 1005, the processing switch 305 of the baseband processor 120 receives a baseband data packet. The baseband data packet includes a baseband input, which represents a baseband signal including communication channels. In one embodiment, the baseband data packet is formatted in a Serial RIO format. The method 1000 then proceeds to step 1010.

In step 1010, the processing switch 305 generates a symbol data packet by performing OFDM operations on the baseband data packet. The symbol data packet generated by the processing switch 305 includes data symbols of the communication channels in the baseband signal. In one embodiment, the processing switch 305 generates the symbol data symbols of the communication channels by performing OFDM operations on the baseband input in the baseband data packet. In some embodiments, the baseband data packet is formatted in a Serial RIO format. The method 1000 then proceeds to step 1015.

In step 1015, the processing switch 305 provides the symbol data packet to one or more of the digital signal processors 315 of the baseband processor 120. In one embodiment, the processing switch 305 provides the symbol data packet to the digital signal processors 315 by broadcasting the symbol data packet to the digital signal processors 315. The method 1000 then proceeds to step 1020.

In step 1020, the digital signal processors 315 individually select data symbols in the symbol data packet received from the processing switch 305. In one embodiment, each digital signal processor 315 is associated with a communication channel and selects the data symbol associated with the communication channel in the symbol data packet.

In one embodiment, a digital signal processor 315 selects a data symbol in the symbol data packet based on the position of the data symbol in the symbol data packet. For example, the data symbols may be interleaved in the symbol data packet according to the communication channels of the data symbols and the digital signal processor 315 may select a data symbol of a communication channel based on the position of the data symbol in the symbol data packet. The method 1000 then proceeds to step 1025.

In step 1025, each of the digital signal processors 315 that selected one or more data symbols in the symbol data packet received from the processing switch 305 generates a channel data packet by performing symbol processing operations on each selected data symbol. The channel data packet generated by a given digital signal processor 315 includes processed data symbols (e.g., data symbols processed by the digital signal processor 315) of the communication channel associated with the digital signal processor 315. In some embodiments, a channel data packet generated by a digital signal processor 315 includes an identifier identifying the communication channel associated with the data symbols in the data packet. In one embodiment, a channel data packet generated by the digital signal processor 315 is formatted in a Serial RIO format. The method 1000 then ends.

In various embodiments, the steps of the method 1000 may be performed in a different order than described above and illustrated in FIG. 10. In some embodiments, two or more of the steps of the method 1000 may be performed substantially simultaneously. In various embodiments, the method 1000 may include more or fewer steps than those described above and illustrated in FIG. 10.

Figure 11:
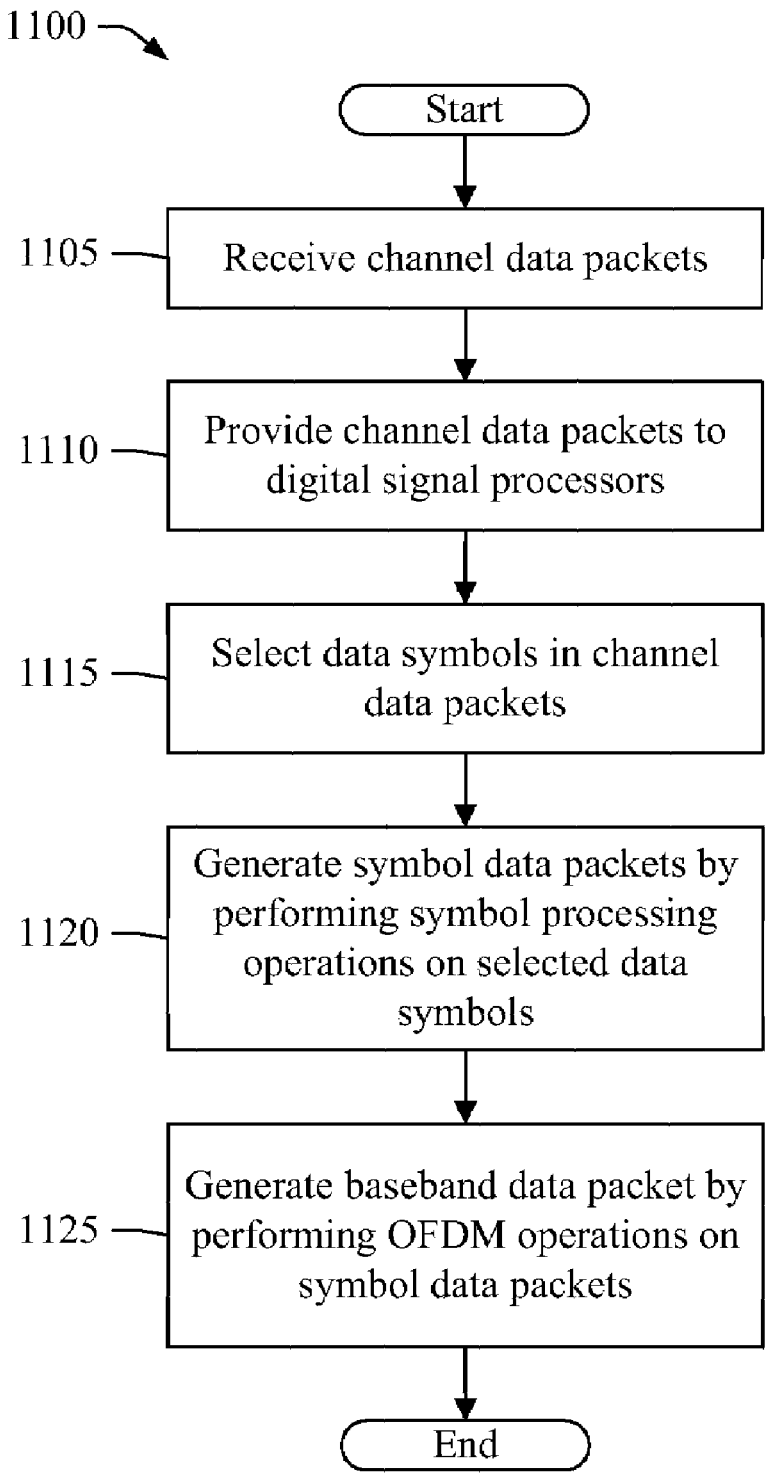
FIG. 11 is a flow chart of a method of processing data in a wireless communication system, in accordance with an embodiment of the present invention.

FIG. 11 illustrates a method 1100 of processing data in a wireless communication system, in accordance with an embodiment of the present invention. In step 1105, the processing switch 305 of the baseband processor 120 receives a set of channel data packets. Each of the channel data packets received by the processing switch 305 includes an identifier of a communication channel and includes data symbols of the communication channel. In one embodiment, each of the channel data packets received by the processing switch 305 is formatted in a Serial RIO format. The method 1100 then proceeds to step 1110.

In step 1110, the processing switch 305 provides the set of channel data packets to one or more of the digital signal processors 315 of the baseband processor 120. In one embodiment, the processing switch 305 provides the set of channel data packets to the digital signal processors 315 by broadcasting the set of channel data packets to the digital signal processors 315. In another embodiment, the processing switch 305 provides the set of channel data packets to the digital signal processors 315 by determining the communication channel associated with each channel data packet in the set of channel data packets and routing the channel data packet to the digital signal processor 315 associated with the communication channel. For example, the processing switch 305 may determine the communication channel associated with a channel data packet based on an identifier of the communication channel in the channel data packet. The method 1100 then proceeds to step 1115.

In step 1115, the digital signal processors 315 select data symbols in the channel data packet received from the processing switch 305. In one embodiment, each digital signal processor 315 is associated with a communication channel. Further, each digital signal processor 315 that receives a channel data packet in the set of channel data packets from the processing switch 305 selects the data symbols of the communication channel associated with the digital signal processor 315 in the channel data packet. For example, a digital signal processor 315 associated with a communication channel may select a channel data packet associated with the same communication channel based on an identifier in the channel data packet and select data symbols of the communication channel in the selected channel data packet. In one embodiment, each channel data packet is associated with a single communication channel and includes an identifier of the communication channel.

In another embodiment, a channel data packet may be associated with one or more communication channels. In this embodiment, a digital signal processor 315 identifies the channel data packet based on an identifier of a communication channel in the channel data packet and selects a data symbol of the communication channel in the channel data packet based on the position of the data symbol in the channel data packet. For example, the data symbols may be interleaved in the data packet according to the communication channels associated with the channel data packet. The method 1100 then proceeds to step 1120.

In step 1120, each of the digital signal processors 315 that selected a data symbol in a channel data packet received from the processing switch 305 generates a symbol data packet by performing symbol processing operations on selected data symbol. The symbol data packet generated by the digital signal processor 315 includes processed data symbols (e.g., data symbols processed by the digital signal processor 315) of the communication channel associated with the digital signal processor 315. Further, the symbol data packet generated by the digital signal processor 315 includes an identifier identifying the communication channel of the data symbols in the symbol data packet. In one embodiment, the symbol data packet generated by the digital signal processor 315 is formatted in a Serial RIO format. The method 1100 then proceeds to step 1125.

In step 1125, the processing switch 305 generates a baseband data packet by performing OFDM operations on the channel data packets received from the digital signal processors 315. The baseband data packet includes a baseband output, which represents a baseband signal including the communication channels associated with the symbol data packets received from the digital signal processors 315. For example, the baseband output may be a bit stream and the baseband data packet generated by the processing switch 305 may include a data payload containing data bytes representing the bit stream. In one embodiment, the baseband data packet generated by the processing switch 305 is formatted in a Serial RIO format. The method 1100 then ends.

In various embodiments, the steps of the method 1100 may be performed in a different order than described above and illustrated in FIG. 11. In some embodiments, two or more of the steps of the method 1100 may be performed substantially simultaneously. In various embodiments, the method 1100 may include more or fewer steps than those described above and illustrated in FIG. 11.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A processing switch configured to receive a first baseband data packet comprising a header including a destination identifier for identifying a destination for the first baseband data packet and a data payload including a baseband input, generate a symbol data packet comprising data symbols by performing at least one orthogonal frequency division multiplexing operation on the baseband input, output the generated symbol data packet from terminals of the processing switch for processing the data symbols in the generated symbol data packet, receive a first set of channel data packets at terminals of the processing switch in response to outputting the generated symbol data packet, each channel data packet of the first set of channel data packets associated with at least one communication channel and comprising at least one processed data symbol, and output the first set of channel data packets.

2. The processing switch of claim 1 further configured to receive a second set of channel data packets each associated with at least one communication channel and comprising at least one data symbol, output the second set of channel data packets from terminals of the processing switch, receive a set of symbol data packets at terminals of the processing switch, each symbol data packet of the set of symbol data packets comprising at least one processed data symbol, generate a second baseband data packet comprising a baseband output by performing at least one orthogonal frequency division multiplexing operation on the set of symbol data packets, and output the second baseband data packet from the processing switch.

3. The processing switch of claim 2, wherein at least one of the first baseband data packet, the second baseband data packet, each channel data packet of the first set of channel data packets, each channel data packet of the second set of channel data packets, the generated symbol data packet, and each symbol data packet of the set of symbol data packets is formatted in a Serial RIO format.

4. The processing switch of claim 3, wherein at least one of the first baseband data packet, the second baseband data packet, each channel data packet of the first set of channel data packets, each channel data packet of the second set of channel data packets, the generated symbol data packet, and each symbol data packet of the set of symbol data packets is formatted in a Parallel RIO format.

5. The processing switch of claim 1, wherein each channel data packet of the first set of channel data packets comprises a header including a channel identifier identifying the channel associated with the channel data packet and a data payload including the at least one processed data symbol of the channel data packet, the processing switch further comprising a packet router for routing each channel data packet of the first set of channel data packets through the processing switch based on the channel identifier of the channel data packet.

6. The processing switch of claim 5, further comprising:
a first processing block configured to convert the baseband input of the first baseband data packet to parallel data by performing at least one orthogonal frequency division multiplexing operation on the baseband input;
a Fourier transform block coupled to the first processing block and configured to generate the data symbols of the generated symbol data packet by performing at least one Fourier transform on the parallel data; and
a second processing block coupled to the Fourier transform block and configured to generate the symbol data packet based on the data symbols generated by the Fourier transform block.

7. A baseband processor comprising:
a processing switch configured to receive a first baseband data packet comprising a header including a destination identifier for identifying a destination for the first baseband data packet and a data payload including a baseband input, the processing switch further configured to generate a symbol data packet comprising data symbols by performing at least one orthogonal frequency division multiplexing operation on the baseband input; and
a plurality of digital signal processors coupled to the processing switch and configured to generate a first set of channel data packets each associated with at least one communication channel, each digital signal processor of the plurality of digital signal processors configured to generate a channel data packet of the first set of channel data packets by selecting at least one data symbol associated with a communication channel in the generated symbol data packet and performing at least one symbol processing operation on the at least one selected data symbol.

8. The baseband processor of claim 7, wherein performing the at least one symbol processing operation on the at least one selected data symbol comprises performing a synchronization operation.

9. The baseband processor of claim 7, wherein each digital signal processor of the plurality of digital signal processors is further configured to receive a channel data packet of a second set of channel data packets, each channel data packet of the second set of channel data packets associated with at least one communication channel and comprising at least one data symbol, and generate a symbol data packet of a set of symbol data packets by performing at least one symbol processing operation on the at least one data symbol in the received channel data packet, and the processing switch is further configured to generate a second baseband data packet comprising a baseband output by performing at least one orthogonal frequency division multiplexing operation on the set of symbol data packets.

10. The baseband processor of claim 7, further comprising a controller configured to program the plurality of digital signal processors.

11. The baseband processor of claim 10, wherein the controller is further configured to program the processing switch.

12. The baseband processor of claim 10, wherein the processing switch comprises a plurality of terminals, each digital signal processor of the plurality of digital signal processors is coupled to a corresponding terminal of the plurality of terminals, the plurality of terminals further comprises an available terminal not coupled to any digital signal processor, the processing switch is further configured to receive an additional digital signal processor at the available terminal, and the controller is further configured to program the additional digital signal processor.

13. The baseband processor of claim 7, further comprising:
   a switching fabric;
   a first interface coupled to the processing switch and the switching fabric, the first interface configured to receive a data packet and to route the data packet to the processing switch or the switching fabric based on an identifier of the data packet; and
   a second interface coupled to the processing switch and the switching fabric, the switching fabric further configured to receive a data packet from the first interface and to route the data packet to the second interface based on an identifier of the data packet.

14. The baseband processor of claim 7, further comprising a packet switch coupled to the plurality of digital signal processors and the second interface, the packet switch configured to receive the second set of channel data packets from the second interface and route each channel data packet of the second set of channel data packets to at least one digital signal processor of the plurality of digital signal processors.

15. The baseband processor of claim 7, wherein each of the first baseband data packet, the generated symbol data packet, and the first set of channel data packets is formatted in a Serial RIO format.

16. The baseband processor of claim 7, wherein each channel data packet of the first set of channel data packets comprises a header including a channel identifier identifying the channel associated with the channel data packet and a data payload including the at least one processed data symbol of the channel data packet, the processing switch further comprising a packet router for routing each channel data packet of the first set of channel data packets through the processing switch based on the channel identifier of the channel data packet.

17. The processing switch of claim 16, wherein the processing switch further comprises:
   a first processing block configured to convert the baseband input of the first baseband data packet to parallel data by performing at least one orthogonal frequency division multiplexing operation on the baseband input;
   a Fourier transform block coupled to the first processing block and configured to generate the data symbols of the generated symbol data packet by performing at least one Fourier transform on the parallel data; and
   a second processing block coupled to the Fourier transform block and configured to generate the symbol data packet based on the data symbols generated by the Fourier transform block.

18. A method of processing data in a wireless communication system, the method comprising:
   receiving a first baseband data packet comprising a header including a destination identifier for identifying a destination for the first baseband data packet and a data payload including a baseband input;
   generating a symbol data packet by performing at least one orthogonal frequency division multiplexing operation on the first baseband data packet, the generated symbol data packet comprising a plurality of data symbols each associated with a communication channel;
   selecting the data symbols associated with each communication channel in the generated symbol data packet; and
   generating a first set of channel data packets by performing at least one symbol processing operation on at least one data symbol of each communication channel selected from the generated symbol data packet to generate a corresponding channel data packet of the first set of channel data packets, each channel data packet of the first set of channel data packets associated with a communication channel.

19. The method of claim 18, wherein the first baseband data packet, the generated symbol data packet, and the first set of channel data packets are formatted in a Serial RIO format.

20. The method of claim 19, wherein selecting the data symbols associated with a communication channel in the generated symbol data packet is based on positions of the data symbols in the generated symbol data packet.

21. The method of claim 19, further comprising programming the digital signal processor to select the data symbols of the communication channel associated with the digital signal processor.

22. The method of claim 18, wherein selecting the data symbols associated with each communication channel in the generated symbol data packet comprises selecting the data symbols associated with a communication channel in the generated symbol data packet by a digital signal processor associated with the communication channel.

23. The method of claim 18, further comprising:
   receiving a second set of channel data packets each associated with at least one communication channel and comprising at least one data symbol;
   selecting data symbols in each channel data packet of the second set of channel data packets;
   generating a set of symbol data packets by performing at least one symbol processing operation on the selected data symbols of each channel data packet in the second set of channel data packets to generate a corresponding symbol data packet in the set of symbol data packets; and
   generating a second baseband data packet by performing at least one orthogonal frequency division multiplexing operation on the set of symbol data packets.

24. The method of claim 23, wherein each data packet of the second set of channel data packets comprises an identifier and selecting the data symbols of each channel data packet in the second set of channel data packets is based on the identifier of the channel data packet.

25. The method of claim 23, wherein selecting the data symbols in each channel data packet of the second set of channel data packets comprises selecting the data symbols of a channel data packet of the second set of channel data packets by a digital signal processor associated with the communication channel of the channel data packet.

26. The method of claim 18, wherein each channel data packet of the first set of channel data packets comprises a header including a channel identifier identifying the channel associated with the channel data packet and a data payload including the at least one processed data symbol of the channel data packet, the method further comprising routing each channel data packet of the first set of channel data packets through a processing switch based on the channel identifier of the channel data packet.

27. The method of claim 26, further comprising:
   converting the baseband input of the first baseband data packet to parallel data by performing at least one orthogonal frequency division multiplexing operation on the baseband input; and
   generating the data symbols of the generated symbol data packet by performing at least one Fourier transform on the parallel data.

* * * * *

UNITED STATES PATENT AND TRADEMARK OFFICE
CERTIFICATE OF CORRECTION

| | | |
|---|---|---|
| PATENT NO. | : 7,693,040 B1 | Page 1 of 1 |
| APPLICATION NO. | : 11/743080 | |
| DATED | : April 6, 2010 | |
| INVENTOR(S) | : Harmeet Bhugra and Bertan Tezcan | |

It is certified that error appears in the above-identified patent and that said Letters Patent is hereby corrected as shown below:

On the Title Page 2:Col. 1, Line 40: Item (56) References Cited, U.S. PATENT DOCUMENTS should include the following references:

| | | |
|---|---|---|
| --7006501 | 2/2006 | Gura et al. |
| 5764927 | 6/1998 | Murphy et al. |
| 6044085 | 3/2000 | Horlander |
| 6988177 | 1/2006 | Sukol |
| 7274705 | 9/2007 | Chang et al. |
| 20080275872 | 11/2008 | Venkatcharay et al. |
| 20080228871 | 9/2008 | Sano |
| 20040114587 | 6/2004 | Huang et al. |
| 20060075311 | 4/2006 | Ranjan et al.-- |

Signed and Sealed this

Twenty-eighth Day of February, 2012

David J. Kappos
*Director of the United States Patent and Trademark Office*